United States Patent
Hansen

(10) Patent No.: US 9,942,455 B2
(45) Date of Patent: *Apr. 10, 2018

(54) TIMING SYSTEM AND METHOD WITH INTEGRATED PARTICIPANT EVENT IMAGE CAPTURE MANAGEMENT SERVICES

(71) Applicant: Innovative Timing Systems, LLC, St. Louis, MO (US)

(72) Inventor: Kurt S. Hansen, Chesterfield, MO (US)

(73) Assignee: Innovative Timing Systems, LLC, St. Louis, MO (US)

( * ) Notice: Subject to any disclaimer, the term of this patent is extended or adjusted under 35 U.S.C. 154(b) by 650 days.

This patent is subject to a terminal disclaimer.

(21) Appl. No.: 14/374,757

(22) PCT Filed: Jan. 25, 2013

(86) PCT No.: PCT/US2013/023167
§ 371 (c)(1),
(2) Date: Jul. 25, 2014

(87) PCT Pub. No.: WO2013/112851
PCT Pub. Date: Aug. 1, 2013

(65) Prior Publication Data
US 2014/0354808 A1    Dec. 4, 2014

Related U.S. Application Data

(60) Provisional application No. 61/590,782, filed on Jan. 25, 2012.

(51) Int. Cl.
*H04N 7/18* (2006.01)
*H04N 5/232* (2006.01)
(Continued)

(52) U.S. Cl.
CPC ..... *H04N 5/23206* (2013.01); *G06K 9/00369* (2013.01); *G06Q 50/10* (2013.01);
(Continued)

(58) Field of Classification Search
None
See application file for complete search history.

(56) References Cited

U.S. PATENT DOCUMENTS 4,142,680 A  3/1979  Oswald et al.
4,505,595 A  3/1985  Rose et al.
(Continued)

FOREIGN PATENT DOCUMENTS

DE    102005026559 A1    12/2006
EP         1548674 A1     6/2005
(Continued)

OTHER PUBLICATIONS

PCT Search Report, PCT US 2011-02671, dated Mar. 1, 2011.
(Continued)

*Primary Examiner* — James M Anderson, II
(74) *Attorney, Agent, or Firm* — Senniger Powers LLP

(57) ABSTRACT

An automated system and method for managing a participant's participation in an event having a participant event management system (PEMS), a participant proximity detector, an image capture system and a timing system. The participant event management system (PEMS) receives a request for capturing an image of the participant during the event. The participant proximity detector detects the proximity of the participant to a detection point and receives the participant number. The image capture system receives an instruction for capturing an image of the participant, receives an indication that the participant has been detected, and captures an image of the participant. The timing system receives the preorder request from the PEMS, determines a (Continued)

time of passing of the detection point of the participant, associates the participant event number with the participant identifier number, generates the instruction for capturing the image of the participant, and receives the transmitted captured image.

26 Claims, 12 Drawing Sheets

(51) Int. Cl.
    *G06Q 50/10*     (2012.01)
    *H04N 1/00*     (2006.01)
    *G07C 1/22*     (2006.01)
    *H04L 12/18*     (2006.01)
    *H04W 4/00*     (2018.01)
    *H04W 4/02*     (2018.01)
    *G06K 9/00*     (2006.01)

(52) U.S. Cl.
    CPC ............ *G07C 1/22* (2013.01); *H04L 12/1813* (2013.01); *H04N 1/00164* (2013.01); *H04N 1/00185* (2013.01); *H04N 7/183* (2013.01); *H04N 7/188* (2013.01); *H04W 4/008* (2013.01); *H04W 4/025* (2013.01)

(56) References Cited

U.S. PATENT DOCUMENTS

| | | | |
|---|---|---|---|
| 4,812,845 A | 3/1989 | Yamada et al. | |
| 4,918,630 A | 4/1990 | Plouff et al. | |
| 5,091,895 A | 2/1992 | Chatwin et al. | |
| 5,140,307 A | 8/1992 | Rebetez et al. | |
| 5,436,611 A | 7/1995 | Arlinghaus, Jr. | |
| 5,493,805 A | 2/1996 | Penuela et al. | |
| 5,511,045 A | 4/1996 | Sasaki et al. | |
| 5,604,485 A | 2/1997 | Lauro et al. | |
| 5,696,481 A | 12/1997 | Pejas et al. | |
| 5,812,049 A | 9/1998 | Uzi | |
| 5,821,902 A | 10/1998 | Keen | |
| 5,883,582 A | 3/1999 | Bowers et al. | |
| 5,973,598 A | 10/1999 | Beigel | |
| 6,008,773 A | 12/1999 | Matsuoka et al. | |
| 6,100,804 A | 8/2000 | Brady et al. | |
| 6,204,813 B1 | 3/2001 | Wadell et al. | |
| 6,278,413 B1 | 8/2001 | Hugh et al. | |
| 6,340,932 B1 | 1/2002 | Rodgers et al. | |
| 6,369,697 B1 | 4/2002 | Poole | |
| 6,466,178 B1 | 10/2002 | Muterspaugh | |
| 6,496,806 B1 | 12/2002 | Horwitz et al. | |
| 6,512,478 B1 | 1/2003 | Chien | |
| 6,570,487 B1 | 5/2003 | Steeves | |
| 6,577,238 B1 | 6/2003 | Whitesmith et al. | |
| 6,696,954 B2 | 2/2004 | Chung | |
| 6,703,935 B1 | 3/2004 | Chung et al. | |
| 6,710,713 B1 | 3/2004 | Russo | |
| 6,720,930 B2 | 4/2004 | Johnson et al. | |
| 6,812,824 B1 | 11/2004 | Goldinger et al. | |
| 6,839,027 B2 | 1/2005 | Krumm et al. | |
| 6,888,459 B2 | 5/2005 | Stilp | |
| 6,888,502 B2 | 5/2005 | Beigel et al. | |
| 6,952,157 B1 | 10/2005 | Stewart et al. | |
| 6,963,270 B1 | 11/2005 | Gallagher, III et al. | |
| 6,989,750 B2 | 1/2006 | Shanks et al. | |
| 6,995,655 B2 | 2/2006 | Ertin et al. | |
| 7,009,562 B2 | 3/2006 | Jenabi | |
| 7,019,639 B2 | 3/2006 | Stilp | |
| 7,057,511 B2 | 6/2006 | Shanks et al. | |
| 7,057,975 B2 | 6/2006 | Stobbe | |
| 7,339,478 B2 | 3/2008 | Le | |
| 7,508,739 B2 | 3/2009 | Paes | |
| 7,589,616 B2 | 9/2009 | Klatsmanyi et al. | |
| 7,605,685 B2 | 10/2009 | Stewart et al. | |
| 7,605,689 B2 | 10/2009 | Hein et al. | |
| 8,085,136 B2 | 12/2011 | Stewart et al. | |
| 8,179,233 B2 | 5/2012 | Kia | |
| 8,332,281 B2 | 12/2012 | Smith et al. | |
| 8,442,922 B2 | 5/2013 | Martin | |
| 2001/0040895 A1 | 11/2001 | Templin | |
| 2002/0008622 A1 | 1/2002 | Weston et al. | |
| 2002/0008624 A1 | 1/2002 | Paek | |
| 2002/0044057 A1 | 4/2002 | Zirbes | |
| 2002/0044096 A1 | 4/2002 | Chung | |
| 2003/0014678 A1 | 1/2003 | Ozcetin et al. | |
| 2003/0073518 A1 | 4/2003 | Marty et al. | |
| 2003/0163287 A1 | 8/2003 | Vock et al. | |
| 2003/0189484 A1 | 10/2003 | Rust et al. | |
| 2004/0006445 A1 | 1/2004 | Paek | |
| 2005/0093976 A1 | 5/2005 | Valleriano et al. | |
| 2005/0099269 A1 | 5/2005 | Diorio et al. | |
| 2005/0138798 A1 | 6/2005 | Sakama et al. | |
| 2006/0097847 A1 | 5/2006 | Bervoets et al. | |
| 2006/0097874 A1 | 5/2006 | Salesky et al. | |
| 2006/0103536 A1 | 5/2006 | Kwak et al. | |
| 2006/0176216 A1 | 8/2006 | Hipskind | |
| 2007/0076528 A1 | 4/2007 | Kirby | |
| 2007/0097969 A1 | 5/2007 | Regnier | |
| 2007/0182567 A1 | 8/2007 | Stewart et al. | |
| 2007/0252770 A1 | 11/2007 | Kai et al. | |
| 2007/0262871 A1 | 11/2007 | Yamagajo et al. | |
| 2007/0272011 A1 | 11/2007 | Chapa, Jr. et al. | |
| 2008/0018479 A1 | 1/2008 | Hashimoto et al. | |
| 2008/0021676 A1 | 1/2008 | Vock et al. | |
| 2008/0111695 A1 | 5/2008 | Yamagajo et al. | |
| 2008/0139263 A1 | 6/2008 | He et al. | |
| 2008/0143620 A1 | 6/2008 | Khatri | |
| 2008/0246615 A1 | 10/2008 | Duron et al. | |
| 2008/0246616 A1 | 10/2008 | Sakama et al. | |
| 2008/0284654 A1 | 11/2008 | Burnside et al. | |
| 2008/0316032 A1 | 12/2008 | Kia | |
| 2009/0015377 A1 | 1/2009 | Fogg et al. | |
| 2009/0141138 A1 | 6/2009 | DeAngelis | |
| 2009/0184806 A1 | 7/2009 | Kia | |
| 2009/0231198 A1 | 9/2009 | Walsh et al. | |
| 2009/0284368 A1 | 11/2009 | Case, Jr. | |
| 2009/0284375 A1 | 11/2009 | Kuo et al. | |
| 2010/0019897 A1 | 1/2010 | Stewart et al. | |
| 2010/0051701 A1 | 3/2010 | Ogata et al. | |
| 2010/0088023 A1 | 4/2010 | Werner | |
| 2010/0271263 A1 | 10/2010 | Moshfeghi | |
| 2010/0295943 A1 | 11/2010 | Cha et al. | |
| 2010/0302910 A1 | 12/2010 | Howell | |
| 2010/0308965 A1 | 12/2010 | Weitzhandler et al. | |
| 2011/0018689 A1 | 1/2011 | McAllister et al. | |
| 2011/0054792 A1 | 3/2011 | McClellan | |
| 2011/0055045 A1 | 3/2011 | Smith et al. | |
| 2011/0141221 A1 | 6/2011 | Satterlee et al. | |
| 2011/0227748 A1 | 9/2011 | Schaible et al. | |
| 2011/0251972 A1 | 10/2011 | Martin | |
| 2011/0298583 A1 | 12/2011 | Libby et al. | |
| 2012/0115557 A1 | 5/2012 | Kia | |
| 2012/0230240 A1 | 9/2012 | Nebat et al. | |
| 2014/0052279 A1 | 2/2014 | Van Rens | |

FOREIGN PATENT DOCUMENTS

| | | |
|---|---|---|
| EP | 2009595 A | 12/2008 |
| JP | 2000271259 A | 10/2000 |
| JP | 2002281492 A | 9/2002 |
| JP | 2003-327331 A | 11/2003 |
| JP | 2006-004065 A | 1/2006 |
| JP | 2006-053655 A | 2/2006 |
| JP | 2008-276353 A | 11/2006 |
| JP | 2008-299535 A | 12/2008 |
| JP | 4394600 A | 10/2009 |
| JP | 2010-088886 A | 4/2010 |
| JP | 2010-202998 A | 9/2010 |
| JP | 2011-002958 A | 1/2011 |
| KR | 10-2002-0008234 A | 1/2002 |
| KR | 10-2002-0065429 A | 8/2002 |
| KR | 10-0438359 B1 | 7/2004 |
| KR | 10-2006-0078335 A | 7/2006 |
| KR | 10-2007-0092982 A | 9/2007 |

(56) References Cited

FOREIGN PATENT DOCUMENTS

| KR | 10-2008-0090269 A | 10/2008 |
|---|---|---|
| KR | 10-2010-0100500 A | 9/2010 |
| KR | 10-2010-0119271 A | 11/2010 |
| WO | PCT/US2014/030105 | 3/2014 |
| WO | PCT/US2014/030107 | 3/2014 |
| WO | PCT/US2014/030537 | 3/2014 |
| WO | PCT/US2014/031125 | 3/2014 |

OTHER PUBLICATIONS

Integration of RFID and Cellular Technologies, UCLA, WINMEC 2004; Karali, Sep. 2004.
Tests on Timing Module for Sports Timing; Trolley Scan Pty, Jun. 2004.
New for 2005—Best Racing now uses DAG chip timing; DAG 2005.
Intermec RFID System Manual; Intermec 2005.
RFID Primer; Alien Technology, 2004.
DAG System Instructions, Version 4; Pygma Lyon (DAG), Jul. 9, 2004.
DAG System Instructions—DAG Triathlon, Version 5; Pygma Lyon (DAG) Jul. 23, 2004.
DAG System—Badgeur V2 Sport Version Datasheet; Pygma Lyon (DAG), Jul. 19, 2004.
Annex 1: Utilization of the Dag Badger System; Pygma Lyon (DAG).
Alien RFID Academy Training Manual; Alien Technology, Sep. 22, 2004.
Alien Advanced RFID Academy; Alien Technology, Mar. 16, 2005.
Reader Interface Guide, V2.1.0; Alien Technology, 2004.
Mobile RFID Reader with Database Wireless Synchronization, S. Sandoval-Reyes, et al, 2nd ICEEE and CIE2005, Mexico City, Sep. 7-9, 2005.
Tag Programming Guide, Nanoscanner Reader v01.02.01, Alien Technology, 2003.
Mitigating the Reader Collision Problem in RFID Networks with Mobile Readers, Shailesh M. Birair and Sridhar Iyer, Indian Institute of Technology, Mumbai, India, 400 076, IEEE, 2005.
PCT Search Report, PCT US 2013/023167, dated Jun. 2, 2013.
U.S. Appl. No. 13/226,408, filed Sep. 6, 2011.
U.S. Appl. No. 13/582,148, filed Aug. 31, 2012.
U.S. Appl. No. 13/521,700, filed Jul. 11, 2012.
U.S. Appl. No. 13/521,664, filed Jul. 11, 2012.
U.S. Appl. No. 13/194,880, filed Jul. 29, 2011.
U.S. Appl. No. 13/980,539, filed Jul. 18, 2013.
U.S. Appl. No. 13/980,675, filed Sep. 11, 2013.
U.S. Appl. No. 13/946,238, filed Jul. 19, 2013.
U.S. Appl. No. 13/980,545, filed Jul. 18, 2013.
U.S. Appl. No. 13/957,336, filed Aug. 1, 2013.
U.S. Appl. No. 14/374,753, filed Jul. 25, 2014.

MESSAGE TYPE | SOURCE | CUSTOM 1 | CUSTOM 2 | CUSTOM N | EOM

DEFINITIONS FOR EACH FIELD IN THE INFORMATION PACKET STRUCTURE

MESSAGE TYPE   —INDICATOR FOR THE TYPE OF MESSAGE BEING SENT
SOURCE         —THE NAME OR ID OF THE TRANSMITTING SYSTEM
CUSTOM 1...N   —VARIABLE LENGTH FIELD CONTAINING USER-DEFINED DATA
EOM            —INDICATOR PLACED AT THE END OF THE INFORMATION PACKET
|              —SEPARATOR USED BETWEEN EACH FIELD OF INFORMATION WITHIN
                THE PACKET, AS WELL AS AT THE END OF AN
                INFORMATION PACKET

FIG. 13

(A) —READ | FROM | TAGSERIALNUMBER | TIME | PACKET# | EOM |
(B) —READ | FROM | PARTICIPANTNAME | TIME | PACKET# | EOM |
(C) —RESEND | FROM | DESTINATION | PACKET# | EOM |
(D) —TSYNC | FROM | IDENTIFIER | PACKET# | EOM |
(E) —LOOKUP | FROM | IDENTIFIER | PACKET# | EOM |
(F) —COMMAND | FROM | DEST | IDENTIFIER | PACKET# | EOM |
(G) —RSIG | FROM | TIME | EOM |
(H) —RQIMAGE | FROM | DEST | IDENTIFIER | COMPRESSION | PACKETSIZE | PSOCKET | EOM |
(I) —STIMAGE | FROM | DEST | IDENTIFIER | COMPRESSION | PACKETSIZE | PSOCKET | EOM |

FIG. 14

TIMING SYSTEM AND METHOD WITH INTEGRATED PARTICIPANT EVENT IMAGE CAPTURE MANAGEMENT SERVICES

CROSS-REFERENCE TO RELATED APPLICATIONS

This application is a United States national phase § 371 application of PCT International Application No. PCT/US13/23167 filed on Jan. 25, 2012, which claimed the benefit of U.S. Provisional Application No. 61/590,782, filed on Jan. 25, 2012.

Further, for US applications, this application is a continuation in part application that claims priority to the following applications:
1. United States national phase 35 USC § 371 application. Ser. No. 13/528,148, filed Aug. 31, 2012, which claimed priority to PCT/US2011/26717, filed Mar. 1, 2011, which claims the benefit of U.S. Provisional Application No. 61/309,259, filed on Mar. 1, 2010 entitled VARIABLY SPACED MULTI-POINT RFID TAG READER SYSTEMS AND METHODS; and U.S. Provisional Application No. 61/369,013, filed on Jul. 29, 2010, entitled AUTOMATED TIMING SYSTEMS AND METHODS HAVING MULTIPLE TIME EVENT RECORDERS AND AN INTEGRATED USER TIME ENTRY INTERFACE.
2. United States national phase 35 USC § 371 application. Ser. No. 13/521,700, filed Jul. 11, 2012, which claimed priority to PCT/US2011/20901, filed Jan. 11, 2011, which claims the benefit of U.S. Provisional Application No. 61/294,024, filed on Jan. 11, 2010, entitled RFID SPORTS TIMING COMMUNICATIONS SYSTEMS AND METHODS; and U.S. Provisional Application No. 61/369,013, filed on Jul. 29, 2010, AUTOMATED TIMING SYSTEMS AND METHODS HAVING MULTIPLE TIME EVENT RECORDERS AND AN INTEGRATED USER TIME ENTRY INTERFACE.
3. U.S. application Ser. No. 13/194,880, filed Jul. 29, 2011, and PCT/US11/46032, filed Jul. 29, 2011, each of which claims the benefit of U.S. Provisional Application No. 61/369,013, filed on Jul. 29, 2010, entitled AUTOMATED TIMING SYSTEMS AND METHODS HAVING MULTIPLE TIME EVENT RECORDERS AND AN INTEGRATED USER TIME ENTRY INTERFACE.
4. United States national phase 35 USC § 371 application. Ser. No. 13/980,539, filed Jul. 18, 2013 that claimed priority to PCT/US12/22125, filed Jan. 20, 2012, which claims the benefit of U.S. Provisional Application No. 61/434,769, filed on Jan. 20, 2011 entitled SYSTEMS AND METHODS FOR IMAGE CAPTURE INTEGRATION AND DETECTION POINT LASER DETECTION IN AN EVENT TIMING SYSTEM.
5. United States national phase 35 USC § 371 application. Ser. No. 13/980,675, filed Sep. 11, 2013 that claimed priority to PCT/US12/022126, filed Jan. 20, 2012, which claims the benefit U.S. Provisional Application No. 61/434,769, filed on Jan. 20, 2011 entitled SYSTEMS AND METHODS FOR IMAGE CAPTURE INTEGRATION AND DETECTION POINT LASER DETECTION IN AN EVENT TIMING SYSTEM.
6. United States national phase 35 USC § 371 application. Ser. No. 13/980,545, filed Jul. 18, 2013 that claimed priority to PCT/US12/022132, filed Jan. 20, 2012, which claims the benefit of U.S. Provisional Application No. 61/434,782, filed on Jan. 20, 2011 entitled EVENT PARTICIPANT LOCATION TRACKING DEVICE AND TIMING SYSTEM AND METHOD.

The disclosures of the above applications are incorporated herein by reference.

FIELD

The present disclosure relates to event registration and timing systems and, more specifically, to integrated timing system ITS integrating a timing system TS with an event participant registration and preordering system (PEMS) for event services for the participant.

BACKGROUND

The statements in this section merely provide background information related to the present disclosure and may not constitute prior art.

SUMMARY

The inventor hereof has succeeded at designing an integrated timing system having an integrated participant event management and services system including the pre-purchase and management of participant event image capture services.

In a first aspect, an automated system and method for managing a participant's participation in an event having a participant event management system (PEMS), a participant proximity detector, an image capture system and a timing system. The participant event management system (PEMS) receives a request for capturing an image of the participant during the event. The participant proximity detector detects the proximity of the participant to a detection point and receives the participant number. The image capture system receives an instruction for capturing an image of the participant, receives an indication that the participant has been detected, and captures an image of the participant. The timing system receives the preorder request from the PEMS, determines a time of passing of the detection point of the participant, associates the participant event number with the participant identifier number, generates the instruction for capturing the image of the participant, and receives the transmitted captured image.

According to one aspect, an automated system is provided for managing a participant's participation in an event wherein the participant is tracked using a participant identifier having a unique participant number. The system includes a participant event management system (PEMS), a participant proximity detector, an image capture system and a timing system. The participant event management system (PEMS) has a user interface receiving an input from the participant including participant data and a registration of the participant in the timed event, the PEMS assigning the participant a participant event number responsive thereto, the PEMS also receiving a preorder request for capturing an image of the participant during the event, the PEMS having a communication interface transmitting the assigned participant event number and the preorder request. The participant proximity detector detecting the participant when in proximity to the participant proximity detector at a detection point during the event and receiving the participant number from the participant identifier, identifying a read time of the received participant identifier read, and transmitting the participant identifier number and the identified participant identifier read time over a data interface. The image capture system has one or more image capture devices and a data interface receiving an instruction for capturing an image of the participant associated with the participant identifier number, receives an indication that the participant proximity detector has received the participant identifier read of the participant identifier number of the participant, captures at least one image of the participant when the participant identifier of the participant is in proximity to the participant proximity detector responsive to the received instruction and the received indication of the proximity of the participant's identifier, generates an image capture message including the captured image, and transmits the image capture message over the data interface. The timing system has a data communication interface, a memory and computer executable instructions, the timing system receiving the participant identifier number and the participant identifier read time from the participant proximity detector, receives the transmitted portion of the assigned participant event number and the preorder request from the PEMS, determines a time of passing of the detection point of the participant responsive to the received participant identifier number and participant identifier read time, associates the participant event number with the participant identifier number and generating the instruction for capturing the image of the participant, receives the transmitted image capture message from the image capture system, and stores in the memory the determined time of passing and the image of the image capture message in the memory associated with the assigned participant event number.

According to another aspect, an automated system is provided for managing a participant's participation in an event wherein the participant is tracked using a participant identifier having a unique participant identifier number. The system includes a participant event management system (PEMS), a participant proximity detector, and an image capture system and a timing system. The participant event management system (PEMS) including a user interface receives an input from the participant including participant data and a registration of the participant in the event, the PEMS assigning the participant a participant event number responsive thereto, the PEMS also receives a preorder request for capturing an image of the participant during the event, the PEMS having a communication interface transmitting at least a portion of the received participant data, the assigned participant event number and the preorder request. The participant proximity detector having a processor, a memory, a clock, an participant transceiver with an antenna receiving the participant identifier number from the participant identifier when the participant identifier comes within a proximity of the participant proximity detector when placed at a detection point of the event, identifying from the clock a read time of the received participant identifier read, and a data interface for transmitting the participant identifier number and the identified participant identifier read time. The image capture system has an image capture device and a data interface receiving an instruction for capturing an image of the participant associated with the participant identifier number, receiving an indication that the participant proximity detector has received the participant identifier read of the participant identifier number of the participant, and capturing at least one image of the participant when the participant identifier of the participant is in proximity to the participant proximity detector responsive to the received indication, generating an image capture message including the image, and transmitting the image capture message over the data interface. The timing system has a data communication interface, a memory and computer executable instructions, the timing system receiving the participant identifier number and the participant identifier read time from the participant proximity detector, receiving transmitted portion of the participant data, the assigned participant event number and the preorder request from the PEMS, thereafter associating the participant event number with the participant identifier number and generating the instruction for capturing the image of the participant, receiving the image capture message from the image capture system, determining a time of passing of the detection point of the participant responsive to the received participant identifier number and participant identifier read time, and storing in the memory the determined time of passing and the image of the image capture message in the memory.

According to yet another aspect, an automated system provides for managing a participant's participation in an event wherein the participant is tracked using a participant identifier having a unique participant identifier number. The system includes a participant event management system (PEMS), a participant proximity detector, a location detection device an image capture system and a timing system. The participant event management system (PEMS) includes a user interface receiving an input from the participant including participant data and a registration of the participant in the event, the PEMS assigning the participant a participant event number responsive thereto, the PEMS also receiving a preorder request for tracking of the participant during the event, the PEMS having a communication interface transmitting the assigned participant event number and the preorder request. The participant proximity detector having a processor, a memory, a clock, an RFID transceiver receiving the participant identifier number from the participant identifier when the participant identifier comes within a proximity of the participant proximity detector when placed at a detection point of the event, identifying from the clock a read time of the received participant identifier read, and a data interface for transmitting the participant identifier number and the identified participant identifier read time. The location device associated with the participant identifier of the participant, the location device having a location data receiver for receiving location data from a location providing source, and a wireless communication interface, the location detection device receiving location information from the location providing source, time stamping each received location information, and transmitting participant location data over the wireless interface. The location detection device in at least periodic wireless communication with the location device for receiving the transmitted participant location data, and transmitting the received location data to the timing system. The timing system has a data communication interface, a memory and computer executable instructions, the timing system receiving the participant identifier number and the participant identifier read time from the participant proximity detector, and receiving the location data, the timing system determining a time of passing of the detection point of the participant responsive to the received participant identifier number and participant identifier read time, storing the determined time of passing and the received location data in the memory associated with the participant identifier number of the participant, receiving the transmitted assigned participant event number and the preorder request from the PEMS, associating the participant event number with the participant identifier number and transmitting the received location data to an output interface.

According to still another aspect, an automated method provides for managing a participant's participation in an event wherein the participant is tracked using a participant identifier having a unique participant identifier number. The method includes various steps performed by various defined components. These include a) in a participant event management system (PEMS) having a user interface, receiving an input from the participant including participant data and a registration of the participant in the event, assigning the participant a participant event number responsive thereto, receiving a preorder request for capturing an image of the participant during the event, and transmitting the assigned participant event number and the preorder request; b) in a participant proximity detector, detecting the participant identifier when in proximity to the participant proximity detector at a detection point during the event, receiving the participant identifier number from the participant identifier, identifying a read time of the received participant identifier read, and transmitting the participant identifier number and the identified participant identifier read time over a data interface; c) in an image capture system with an image capture device and a data interface, receiving an instruction for capturing an image of the participant associated with the participant identifier number, receiving an indication that the participant proximity detector has received the participant identifier read of the participant identifier number of the participant, capturing at least one image of the participant when the participant identifier of the participant is in proximity to the participant proximity detector responsive to the received indication, generating an image capture message including the image, and transmitting the image capture message over the data interface; and d) in a timing system having a processor, a data communication interface, a memory and computer executable instructions for receiving the participant identifier number and the participant identifier read time from the participant proximity detector, receiving the image capture message from the image capture system, determining a time of passing of the detection point of the participant responsive to the received participant identifier number and participant identifier read time, storing the determined time of passing and the image of the image capture message in the memory, receiving the assigned participant event number and the preorder request from the PEMS, associating the participant event number with the participant identifier number, and generating the instruction for capturing the image of the participant.

In yet an aspect, an automated method is provided for managing a participant's participation in an event wherein the participant is tracked using a participant identifier having a unique participant identifier number. The method is performed in defined system components including: a) in a participant event management system (PEMS) including a user interface, receiving an input from the participant including participant data and a registration of the participant in the event, assigning the participant a participant event number responsive thereto, receiving a preorder request for tracking of the participant during the event, and transmitting the assigned participant event number and the preorder request; b) in a participant proximity detector having a processor, a memory, a clock, an participant transceiver, receiving the participant identifier number from the participant identifier when the participant identifier comes within a proximity of the participant proximity detector when placed at a detection point of the event, identifying a read time of the received participant identifier read, and transmitting the participant identifier number and the identified participant identifier read time; c) in a location device associated with the participant identifier of the participant, receiving location data from a location-providing source, time stamping each received location information, and transmitting participant location data over the wireless interface; d) in a location detection device in at least periodic wireless communication with the location device, receiving the transmitted partici-
pant location data, and transmitting the received location data to the timing system; and e) in a timing system having a processor, a data communication interface, a memory and computer executable instructions, receiving the participant identifier number and the participant identifier read time from the participant proximity detector, receiving the location data, determining a time of passing of the detection point of the participant responsive to the received participant identifier number and participant identifier read time, storing the determined time of passing and the received location data in the memory associated with the participant identifier number of the participant, receiving the assigned participant event number and the preorder request from the PEMS, associating the participant event number with the participant identifier number, and transmitting the received location data to an output interface.

Further aspects of the present disclosure will be in part apparent and in part pointed out below. It should be understood that various aspects of the disclosure might be implemented individually or in combination with one another. It should also be understood that the detailed description and drawings, while indicating certain exemplary embodiments, are intended for purposes of illustration only and should not be construed as limiting the scope of the disclosure.

BRIEF DESCRIPTION OF THE DRAWINGS

FIG. 13 is an illustration of the format for the variable length packet messages according to one exemplary embodiment.

FIG. 14 is an illustration of the formats for an exemplary set of messages according to one exemplary embodiment.

It should be understood that throughout the drawings, corresponding reference numerals indicate like or corresponding parts and features.

DETAILED DESCRIPTION

Figure 1:
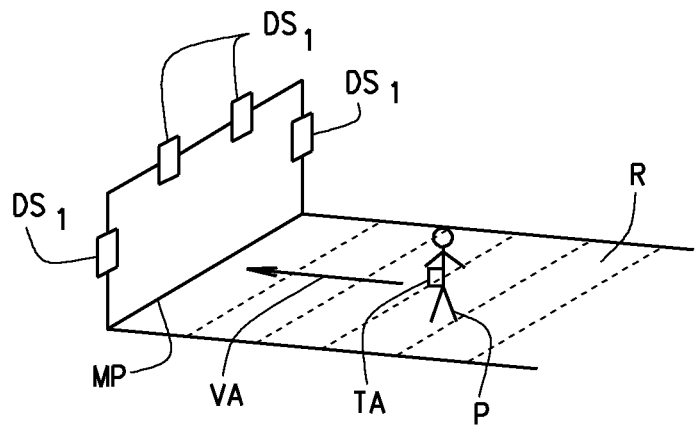
FIG. 1 is a schematic illustration of a typical STS system configuration that is used to read a Race Bib Tag as it passes participant proximity detector reader that can include in some embodiments, antennas are mounted overhead and on the side of a racecourse. The specific location of the antennas could be changed to include any position that is deemed suitable for receiving the Bib Tag signal from the tag according to one exemplary embodiment.

The following description is merely exemplary in nature and is not intended to limit the present disclosure or the disclosure's applications or uses.

Before turning to the figures and the various exemplary embodiments illustrated therein, a detailed overview of various embodiments and aspects is provided for purposes of breadth of scope, context, clarity, and completeness.

In one embodiment, an automated system and method for managing a participant's participation in an event having a participant event management system (PEMS), a participant proximity detector, an image capture system and a timing system. The participant event management system (PEMS) receives a request for capturing an image of the participant during the event. The participant proximity detector detects the proximity of the participant to a detection point and receives the participant number. The image capture system receives an instruction for capturing an image of the participant, receives an indication that the participant has been detected, and captures an image of the participant. The timing system receives the preorder request from the PEMS, determines a time of passing of the detection point of the participant, associates the participant event number with the participant identifier number, generates the instruction for capturing the image of the participant, and receives the transmitted captured image.

In one embodiment, an automated system for managing a participant's participation in an event wherein the participant is tracked using a participant identifier having a unique participant identifier number. This can be a participant tag or other participant identifier such as a bib or other means including images of the participant or their vehicle for uniquely identifying the particular participant from among a plurality of participants. Often these events are timed events, but the present disclosure includes both timed and untimed events wherein a participant in the event is tracked. It should be noted that the participant tag or other participant identifier and participant tag number can be of any type. As will be discussed herein, by way of one exemplary embodiment, the participant identifiers can be participant identifiers such as an RFID tag and the RFID detection systems and RFID participant proximity detectors can then be RFID tag readers and detection systems. However, RFID tags and tag readers are only one technology, and for the purposes of this disclosure, one skilled in the art should be aware that any types of RFID tags and readers or trackers or detection systems could be used and still be within the scope of the present invention. As such, for the remainder of the present specification and disclosure, any reference to an RFID tag or RFID technology is only exemplary, and should not be viewed as being limited to only RFID technology. Further, any reference herein to a tag reader should be understood to be any participant proximity detector that detects the presence of the participant in proximity to the detector. This could include an image or laser or GPS detection system and technology as well as the RFID technology, and other related technologies, and all are considered with the scope of this disclosure. Any reference to tag reader or tag should be interpreted as only one exemplary embodiment for implementing the tracking and identification of the participant relative to a detector.

The timing system can include a participant event management system (PEMS) including a user interface receiving an input from the participant including participant data and a registration of the participant in the timed event, the PEMS assigning the participant a participant event number responsive thereto, the PEMS also receiving a preorder request for capturing an image of the participant during the event, the PEMS having a communication interface transmitting at least a portion of the received participant data, the assigned participant event number and the preorder request, an RFID tag reader detecting the RFID tag when in proximity to the RFID tag reader at a detection point during the event and receiving the RFID tag number from the RFID tag, identifying a tag read time of the received RFID tag read, and transmitting the RFID tag number and the identified RFID tag read time over a data interface, an image capture system with an image capture device and a data interface receiving an instruction for capturing an image of the participant associated with the RFID tag number, receiving an indication that the RFID tag reader has received the RFID tag read of the RFID tag number of the participant, and capturing at least one image of the participant when the RFID tag of the participant is in proximity to the RFID tag reader responsive to the received indication, generating an image capture message including the image, and transmitting the image capture message over the data interface, and a timing system having a processor, a data communication interface, a memory and computer executable instructions, the timing system receiving the RFID tag number and the RFID tag read time from the RFID tag reader, and receiving the image capture message from the image capture system, the timing system determining a time of passing of the detection point of the participant responsive to the received RFID tag number and RFID tag read time, storing the determined time of passing and the image of the image capture message in the memory, the timing system also receiving the participant data, the assigned participant event number, and the preorder request from the PEMS, thereafter associating the participant event number with the RFID tag number and generating the instruction for capturing the image of the participant.

In some embodiments, the preorder request includes a designation for the delivery of the captured image, wherein the PEMS transmits the delivery designation and the timing system receiving the transmitted delivery designation, wherein the timing system is configured to transmit the received captured image over the data communication interface responsive to the received delivery designation.

In some embodiment, the delivery designation is selected from the group consisting of: a web page, a web page of the PEMS, a mobile phone, an email address, a text message, a social network wall, and an internet address.

In some embodiment, the preorder request includes a designation for delivery of the captured image during or following the event, wherein such delivery designation includes one or more of the following:

a) updating the participant's social network wall with the captured image and/or determined time of passing, b) updating a third parties social network wall with the captured image and/or determined time of passing, c) transmitting an email to an email address including the captured image and/or determined time of passing, d) transmitting a text message to telephone number including the captured image and/or determined time of passing, e) posting on a webpage the captured image and/or determined time of passing, f) updating an application with the captured image and/or determined time of passing, g) displaying on a coupled display the captured image and/or determined time of passing, and h) updating a webpage or display or data file in the PEMS with the captured image and/or determined time of passing.

As such, the timing system and the PEMS system can work together for providing a captured image (that includes a streaming of images such as a video) to various participant or third party designated output and based on the format that is required capture images or video of the participants at any timing point and then associate the photo with multiple tag or participant identifier reads that occurred at the same time as there may be numerous participants at that location. The identified time comes from the timing system, which is synchronized to the detector/reader time. Thus, the system can take a photo and or video and determine based on the reads which participant is associated with the images. As numerous participant proximity detections are made at any detection point. This can also be helpful for backing up a participant detection system that may miss a participant at a particular detection point. Therefore, if a participant knows about when they crossed the particular detection or timing point, an operator of the timing and/or PEMS system can retrieve the participant's captured image even though the read did not so identify them.

In another embodiment, videos of the participants at any timing point or detection point that is detected by a participant proximity detector such as with an RFID chip read that triggers the recording of a video. In this case, since the participant can be identified prior to the direct proximity to the image capture device, for example an RFID tag read that may be as much as 75 feet prior to the actual monitored point, the video image capture device can record images of the participant as they approach a timing point or at other locations based on user definable parameters. This can include having a photo taken 20 to 50 feet after the timing point because the captured image or picture may look better. In this case, the process described herein for tag reads and image capture can include a time offset or delay so that the image capture is at the preferred operator or participant location rather than at a participant detection point.

In some embodiments, the PEMS includes a payment receipt interface for receiving a payment by the participant in response to the participant registering for the event and/or submitting the preorder request for capturing an image of the participant during the event. In some embodiment, the PEMS transmits a payment indicator reflecting said payment and identifying services associated with said received payment, and wherein the timing system receives the payment indicator for the participant and stores the payment indicator and identifies the services associated with the payment in a data file associated with the participant, such as the bib number, participant number, or the RFID tag number.

In some embodiments, the image is encrypted and/or compressed and wherein the image is transmitted with an indicator of such encryption or compression.

In some embodiments, the PEMS is receiving in the preorder request a request for tracking of the participant during the event. The system further includes a location device associated with the RFID tag of the participant, the location device having a location data receiver for receiving location data from a location providing source, and a wireless communication interface, the location detection device receiving location information from the location providing source, time stamping each received location information, and transmitting tag location data over the wireless interface, a location detection device in at least periodic wireless communication with the location device for receiving the transmitted tag location data, and transmitting the received location data to the timing system, wherein the timing system receives the preorder request from the PEMS including the request for tracking of the participant and stores the received location data for the participant in a data file associated with the participant.

For example, the system as described herein can associate captured photos or videos taken anywhere on the route R where location data is available. If a participant has a GPS enable tracking device such as a smart phone or provided location tractor device, images capture devices can be located at any location on a route R and not necessarily associated with a participant proximity detector such as an RFID tag reader at a split point or finish line. In this embodiment, the image capture devices such as cameras capture all video or take photos throughout the entire event of all passing participants. These are all stored and have a GPS location and time of capture associated with each. As such, an operator or software system can then use location data captured from the participant's location tracking device to associate the location of the participant at the various image capture devices (whose location is also known). In this manner, the captured location data of the participant can be compared with the captured images throughout the traveled route.

In some embodiments, the preorder request includes a designation for the delivery of the tracking data during or following the event, wherein the PEMS transmits the tracking delivery designation and the timing system receiving the transmitted tracking delivery designation, wherein the timing system is configured to transmit the received tracking data over the data communication interface responsive to the received tracking delivery designation.

In some embodiments, the tracking delivery designation is selected from the group consisting of: a web page, a web page of the PEMS, a mobile phone, a wall of a social network, and an internet address.

In some embodiments, the preorder request includes a designation for delivery of the tracking data of the participant during or following the event, wherein such tracking delivery designation includes one or more of the following:

a) updating the participant's social network wall with the tracking data and/or determined time of passing, b) updating a third parties social network wall with the tracking data and/or determined time of passing c) posting on a webpage the tracking data and/or determined time of passing d) updating an application with the tracking data and/or determined time of passing, e) displaying on a coupled display a map showing the location based on the tracking data for the participant, and f) updating a webpage or display or data file in the PEMS with the captured image and/or determined time of passing.

In some embodiments, the PEMS system hosts a webpage including the user interface.

As a couple of examples of such as system and services enabled by this system, a system can track a participant using GPS or other form of location tracking throughout the event. The timing system and or PEMS can post live captured image of the participant on a screen, display, or webpage that displays a moving map of the route while the participant travels from the beginning to the end. In this manner, throughout the entire event, relatives, fans, race organizers, media locally positioned or remote from the event can view the captured images of the particular desired participant at any point during the event. In other words, as a friend is running the Boston Marathon, another friend can follow his progress on a smart phone or webpage by watching the displayed moving map. As the participant passes a camera location, the photo or video is taken of him and the present system as described herein can provide for the displaying of such captured images of that particular friend participant on a map that is generated, transmitted and then displayed on my desired device. The application of the user interface can include a capability enabling me to not only view the captured images in near real time, but can also enable the viewer to manipulate the images such as to crop the image, to zoom in or out.

In another application and set of enabled services, the image capture devices can send the images to the timing or PEMS or other system that includes facial recognition software. The facial recognition software can be used to enable the identification of a participant. This can be the sole means of participant detection or can be a supplemental participant proximity detection capability for identifying a participant who may not have worn their bib properly during the race or whose RFID tag chip went dead. In practice, in some embodiments, this may include the capturing of an initial participant image as a part of the participant data during the PEMS registration process. For instance, when a participant provides the PEMS with participant data, this could include capturing an image of the participant's face. This can be provided by the Applicant or captured and provided via a smart phone application for instance or via a webcam at home on their computer, or during the day of the race at the location of the race. Now that the system has the participant's initial photo, the software can identify key features such as their face, hair color, tattoos, and use that information to later identify that person from among the plurality of participants when a video or a photo is taken of the participant during the event. In the alternative, the image capture device and recognition software can be used to capture an image of a participant number such as a car number or bib number for participant identification and/or participant proximity detection. This can include reading a QR code, a bar code, a car or bike number or the bib number itself and identify the participant from a comparison of the stored participant data.

In another embodiment, an automated system for managing a participant's participation in a timed event wherein the participant is tracked using an a participant identifier such as an RFID tag that has a unique RFID tag number, the system comprising: a participant event management system (PEMS) including a user interface configured for receiving an input from the participant including participant data and a registration of the participant in the timed event, the PEMS assigning the participant a participant event number responsive thereto, the PEMS also configured for receiving a preorder request for capturing an image of the participant during the event, the PEMS having a communication interface configured for transmitting at least a portion of the received participant data, the assigned participant event number and the preorder request, an RFID tag reader having a processor, a memory, a clock, an RFID transceiver receiving the RFID tag number from the RFID tag when the RFID tag comes within a proximity of the RFID tag reader when placed at a detection point of the event, identifying a tag read time of the received RFID tag read, and a data interface for transmitting the RFID tag number and the identified RFID tag read time, an image capture system with an image capture device and a data interface configured for receiving an instruction for capturing an image of the participant associated with the RFID tag number, receiving an indication that the RFID tag reader has received the RFID tag read of the RFID tag number of the participant, and capturing at least one image of the participant when the RFID tag of the participant is in proximity to the RFID tag reader responsive to the received indication, generating an image capture message including the image, and transmitting the image capture message over the data interface, and a timing system having a processor, a data communication interface, a memory and computer executable instructions, the timing system configured for receiving the RFID tag number and the RFID tag read time from the RFID tag reader, and receiving the image capture message from the image capture system, the timing system configured for determining a time of passing of the detection point of the participant responsive to the received RFID tag number and RFID tag read time, storing the determined time of passing and the image of the image capture message in the memory, the timing system also configured for receiving the participant data, the assigned participant event number, and the preorder request from the PEMS, thereafter associating the participant event number with the RFID tag number and generating the instruction for capturing the image of the participant.

In another embodiment, an automated system provides for managing a participant's participation in a timed event wherein the participant is tracked using an RFID tag having a unique RFID tag number, the system including a participant event management system (PEMS) including a user interface configured for receiving an input from the participant including participant data and a registration of the participant in the timed event, the PEMS assigning the participant a participant event number responsive thereto, the PEMS also configured for receiving a preorder request for tracking of the participant during the event, the PEMS having a communication interface configured for transmitting at least a portion of the received participant data, the assigned participant event number and the preorder request, an RFID tag reader having a processor, a memory, a clock, an RFID transceiver receiving the RFID tag number from the RFID tag when the RFID tag comes within a proximity of the RFID tag reader when placed at a detection point of the event, identifying a tag read time of the received RFID tag read, and a data interface for transmitting the RFID tag number and the identified RFID tag read time, a location device associated with the RFID tag of the participant, the location device having a location data receiver for receiving location data from a location providing source, and a wireless communication interface, the location detection device receiving location information from the location providing source, time stamping each received location information, and transmitting tag location data over the wireless interface, a location detection device in at least periodic wireless communication with the location device for receiving the transmitted tag location data, and transmitting the received location data to the timing system, a timing system having a processor, a data communication interface, a memory and computer executable instructions, the timing system configured for receiving the RFID tag number and the RFID tag read time from the RFID tag reader, and receiving the location data, the timing system configured for determining a time of passing of the detection point of the participant responsive to the received RFID tag number and RFID tag read time, storing the determined time of passing and the received location data in the memory associated with the RFID tag number of the participant, the timing system also configured for receiving the participant data, the assigned participant event number, and the preorder request from the PEMS, associating the participant event number with the RFID tag number and transmitting the received location data to an output interface.

In some embodiments, the preorder request includes a designation for the delivery of the captured image, wherein the PEMS transmits the delivery designation and the timing system receiving the transmitted delivery designation, wherein the timing system is configured to transmit the received tracking data over the data communication interface responsive to the received delivery designation.

In some embodiments, the delivery designation is selected from the group consisting of: a web page, a web page of the PEMS, a mobile phone, an email address, a text message, a social network wall, and an internet address.

In some embodiments, the preorder request includes a designation for delivery of the tracking data during or following the event, wherein such delivery designation includes one or more of the following:

a) updating the participant's social network wall with the tracking data, b) updating a third parties social network wall with the tracking data, c) transmitting an email to an email address including the tracking data, d) transmitting a text message to telephone number including the tracking data, e) posting on a webpage a map showing the location or path traveled by the participant based on the tracking data, f) updating an application with the tracking data and/or determined time of passing, g) displaying on a coupled display a map using the tracking data, and h) updating a webpage or display or data file in the PEMS with the tracking data.

This can also include displaying on the map a captured image of the participant.

In some embodiments, the PEMS includes a payment receipt interface for receiving a payment by the participant in response to the participant registering for the event and/or submitting the preorder request for tracking the participant during the event.

In some embodiments, the PEMS transmits a payment indicator reflecting said payment and identifying services associated with said received payment, and wherein the timing system receives the payment indicator for the participant and stores the payment indicator and identifies the services associated with the payment in a data file associated with the participant, such as the bib number, participant number, participant identifier number such as the RFID tag number.

In some embodiments, the location device is a GPS receiver and wherein the tracking data includes a plurality of GPS locations.

According to another embodiment, an automated method for managing a participant's participation in a timed event wherein the participant is tracked using an RFID tag having a unique RFID tag number, the method comprising: a) in a participant event management system (PEMS) having a user interface: receiving an input from the participant including participant data and a registration of the participant in the timed event, assigning the participant a participant event number responsive thereto, receiving a preorder request for capturing an image of the participant during the event, transmitting at least a portion of the received participant data, the assigned participant event number and the preorder request; b) in an RFID tag reader configured, detecting the RFID tag when in proximity to the RFID tag reader at a detection point during the event, receiving the RFID tag number from the RFID tag, identifying a tag read time of the received RFID tag read, and transmitting the RFID tag number and the identified RFID tag read time over a data interface; c) in an image capture system with an image capture device and a data interface configured: receiving an instruction for capturing an image of the participant associated with the RFID tag number, receiving an indication that the RFID tag reader has received the RFID tag read of the RFID tag number of the participant, capturing at least one image of the participant when the RFID tag of the participant is in proximity to the RFID tag reader responsive to the received indication, generating an image capture message including the image, and transmitting the image capture message over the data interface; and d) in a timing system having a processor, a data communication interface, a memory and computer executable instructions: receiving the RFID tag number and the RFID tag read time from the RFID tag reader, receiving the image capture message from the image capture system, determining a time of passing of the detection point of the participant responsive to the received RFID tag number and RFID tag read time, storing the determined time of passing and the image of the image capture message in the memory, receiving the participant data, the assigned participant event number, and the preorder request from the PEMS, associating the participant event number with the RFID tag number, and generating the instruction for capturing the image of the participant.

In some embodiments, the preorder request includes a designation for the delivery of the captured image, wherein in the PEMS transmitting the delivery designation and in the timing system receiving the transmitted delivery designation, transmitting the received captured image over the data communication interface responsive to the received delivery designation.

In some embodiments, the delivery designation is selected from the group consisting of: a web page, a web page of the PEMS, a mobile phone, an email address, a text message, a social network wall, and an internet address.

In some embodiments, the preorder request includes a designation for delivery of the captured image during or following the event, wherein such delivery designation includes one or more of the following processes and such process are responsively performed by the timing system:

a) updating the participant's social network wall with the captured image and/or determined time of passing, b) updating a third parties social network wall with the captured image and/or determined time of passing, c) transmitting an email to an email address including the captured image and/or determined time of passing, d) transmitting a text message to telephone number including the captured image and/or determined time of passing, e) posting on a webpage the captured image and/or determined time of passing, f) updating an application with the captured image and/or determined time of passing, g) displaying on a coupled display the captured image and/or determined time of passing, and h) updating a webpage or display or data file in the PEMS with the captured image and/or determined time of passing.

An image of the route can be displayed such as a map, and the captured images of a particular participant can be displayed as the participant traverses a particular location on the map.

In some embodiments, the PEMS receiving a payment by the participant in response to the participant registering for the event and/or submitting the preorder request for capturing an image of the participant during the event. In some embodiments, the PEMS transmitting a payment indicator reflecting said payment and identifying services associated with said received payment, and wherein in the timing system receiving the payment indicator for the participant and storing the payment indicator and identifying the services associated with the payment in a data file associated with the participant, such as the bib number, participant number, or the RFID tag number.

In some embodiments, the method also includes encrypting and/or compressing the image that is transmitted and includes an indicator of such encryption or compression.

In some embodiments, the PEMS receiving a preorder request for tracking of the participant during the event, in a location device associated with the RFID tag of the participant, receiving location data from a location providing source, time stamping each received location information, and transmitting location data over the wireless interface, and in a location detection device in at least periodic wireless communication with the location device for receiving the transmitted tag location data, and transmitting the received location data to the timing system, wherein in the timing system receiving the preorder request from the PEMS including the request for tracking of the participant and storing the received location data for the participant in a data file associated with the participant.

In some embodiments, the PEMS receiving in the preorder request a designation for the delivery of the tracking data during or following the event, transmits the tracking delivery designation in the preorder request and in the timing system receiving the transmitted tracking delivery designation and transmitting the received tracking data over the data communication interface responsive to the received tracking delivery designation.

In some embodiments, the tracking delivery designation is selected from the group consisting of: a web page, a web page of the PEMS, a mobile phone, a wall of a social network, and an internet address.

In some embodiments, the preorder request includes a designation for delivery of the tracking data of the participant during or following the event, wherein such tracking delivery designation and the processes of the timing system include one or more of the following:

a) updating the participant's social network wall with the tracking data and/or determined time of passing, b) updating a third parties social network wall with the tracking data and/or determined time of passing, c) posting on a webpage the tracking data and/or determined time of passing, d) updating an application with the tracking data and/or determined time of passing, e) displaying on a coupled display a map showing the location based on the tracking data for the participant, and f) updating a webpage or display or data file in the PEMS with the captured image and/or determined time of passing.

In some embodiments, the PEMS system hosts a webpage including the user interface.

In another exemplary embodiment, an automated method for managing a participant's participation in a timed event wherein the participant is tracked using an RFID tag having a unique RFID tag number, the method comprising: a) in a participant event management system (PEMS) including a user interface: receiving an input from the participant including participant data and a registration of the participant in the timed event, assigning the participant a participant event number responsive thereto, receiving a preorder request for tracking of the participant during the event, transmitting at least a portion of the received participant data, the assigned participant event number and the preorder request; b) in an RFID tag reader having a processor, a memory, a clock, an RFID transceiver: receiving the RFID tag number from the RFID tag when the RFID tag comes within a proximity of the RFID tag reader when placed at a detection point of the event, identifying a tag read time of the received RFID tag read, transmitting the RFID tag number and the identified RFID tag read time; c) in a location device associated with the RFID tag of the participant: receiving location data from a location providing source, time stamping each received location information, and transmitting tag location data over the wireless interface; d) in a location detection device in at least periodic wireless communication with the location device: receiving the transmitted tag location data, and transmitting the received location data to the timing system; e) in a timing system having a processor, a data communication interface, a memory and computer executable instructions: receiving the RFID tag number and the RFID tag read time from the RFID tag reader, receiving the location data, determining a time of passing of the detection point of the participant responsive to the received RFID tag number and RFID tag read time, storing the determined time of passing and the received location data in the memory associated with the RFID tag number of the participant, receiving the participant data, the assigned participant event number, and the preorder request from the PEMS, associating the participant event number with the RFID tag number, and transmitting the received location data to an output interface.

In some embodiments, the PEMS receiving in the preorder request a designation for the delivery of the captured image, and in the timing system receiving the transmitted delivery designation in the preorder request and transmitting the received tracking data over the data communication interface responsive to the received delivery designation.

In some embodiments, the delivery designation is selected from the group consisting of: a web page, a web page of the PEMS, a mobile phone, an email address, a text message, a social network wall, and an internet address.

In some embodiments, the preorder request includes a designation for delivery of the tracking data during or following the event, wherein such delivery designation includes and the timing system responsively performs and/or initiates one or more of the following:

a) updating the participant's social network wall with the tracking data, b) updating a third parties social network wall with the tracking data, c) transmitting an email to an email address including the tracking data, d) transmitting a text message to telephone number including the tracking data, e) posting on a webpage a map showing the location or path traveled by the participant based on the tracking data, f) updating an application with the tracking data and/or determined time of passing, g) displaying on a coupled display a map using the tracking data, and h) updating a webpage or display or data file in the PEMS with the tracking data.

In some embodiments, the PEMS includes a payment receipt interface for receiving a payment by the participant in response to the participant registering for the event and/or submitting the preorder request for tracking the participant during the event.

In some embodiments, the PEMS transmits a payment indicator reflecting said payment and identifying services associated with said received payment, and wherein the timing system receives the payment indicator for the participant and stores the payment indicator and identifies the services associated with the payment in a data file associated with the participant, such as the bib number, participant number, or the RFID tag number.

FIG. 1 is a schematic illustration of a typical integrated timing system STS system configuration that is used to read detect the passing of a participant P by a detection or monitored point MP during an event along route R at a velocity $V_A$. In this exemplary embodiment, a Race Bib Tag $T_A$ passes detection systems $DS_1$ that can be RFID detection sensors $DS_1$ that are mounted overhead and on the side of an event course. The specific location of the detection sensors DS can be changed to include any position that is deemed suitable for receiving the Bib Tag signal from the tag $T_A$ according to one exemplary embodiment. The detection sensors DS (shown as $DS_N$ such as $DS_1$, $DS_2$, $DS_3$ typically include at least a locally mounted antenna and possibly additional supporting electronics. As shown in an exemplary embodiment of FIG. 1, a typical Timing System TS for detecting and timing of a participant or object passing a detection point MP by reading an identification tag $T_A$ placed on the participant P or object (generally referred from hereon as a participant, but meaning both a participant of an object) such as an RFID a Race Bib Tag $T_A$ of a participant P as the participant P travels along route R and passes detection sensors $DS_1$ such as RFID detector antenna that are mounted overhead and on the side of a race course proximate to the monitored point MP. In some embodiments the DS sensors are mounted under a mat or in or on a bollard. The specific location of the detection sensors $DS_1$ could be changed to include any position that is deemed suitable for receiving the Bib Tag signal from the tag $T_A$ according to one exemplary embodiment.

Figure 2:
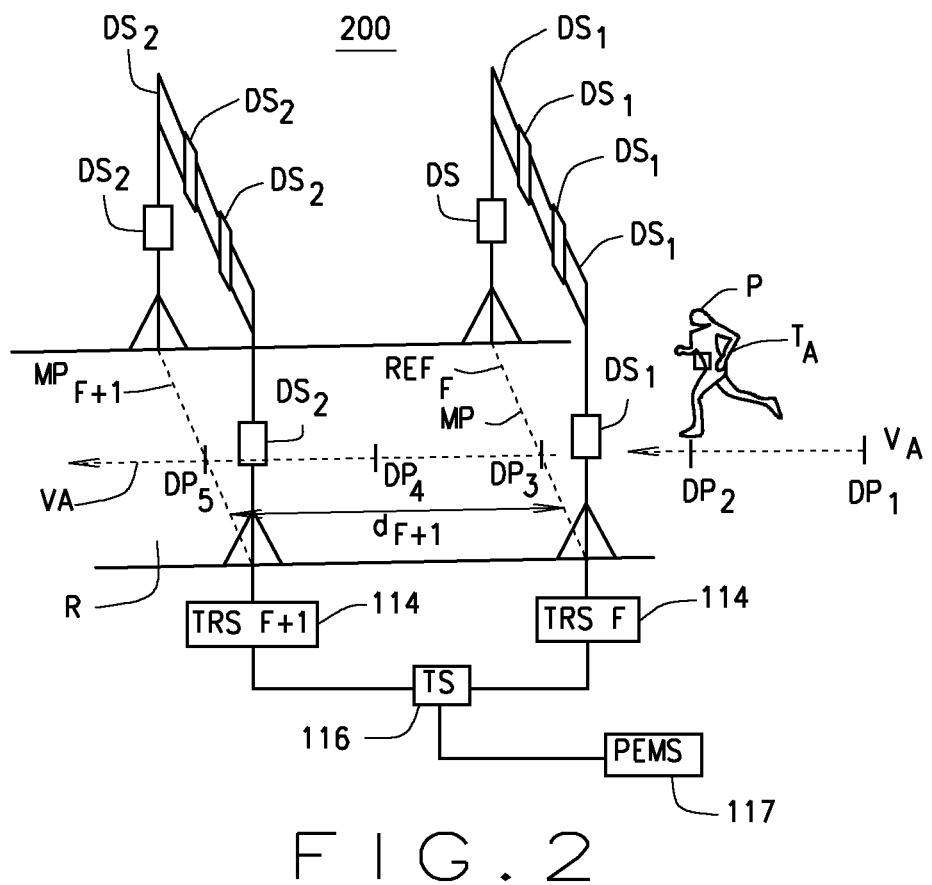
FIG. 2 is a schematic drawing showing an participant Timing System using redundant participant proximity detector shown as an participant proximity detector system (TRS) each with multiple participant proximity detector detection systems (DS) according to one exemplary embodiment, according to a first exemplary embodiment.

FIG. 2 illustrates another RFID TS 200 has two spaced apart RFID tag reading systems $TRS_F$ and 114 $TRS_{F+1}$ 114 each having a plurality of detection systems $DS_1$ and $DS_2$ respectively that can include wireless antenna at a different spaced apart monitored point. The timing system TS 116 is coupled to the PEMS 117. In this application, $TRS_F$ monitors with detection sensors $DS_1$ at monitored point $MP_F$, which is also shown here as Reference point F $REF_F$. $TRS_{F+1}$ monitors with RFID detection sensors $DS_2$ at monitored point $MP_{F+1}$, that is space at a distance of $D_{F+1}$ behind $MP_F$. The PEMS 117 is shown as well as the various outputs for PEMS designated delivery of tracking data or images. The RFID TS 200 can read tag $T_A$ at various detection points DP along the participants route VA, such as $DP_1$ and then $DP_2$ as the participant P approaches monitored point $MP_F$. An addition read can be taken at the monitored point MP as $DP_3$. Each of these and the tag reads can be taken by either $TRS_F$ or $TRS_{F+1}$, however, in some embodiments, the RF can be adjusted and the system software can be written so that tag reads of $DP_1$, $DP_2$ and $DP_3$ are read or at least the tag reads sent, are only those as read by detection systems $DS_1$. As the participant continues past monitored point MP, $TRS_{F+1}$ and detection sensors $DS_2$ can read the tag $T_A$ at additional detection points $DP_4$ and $DP_5$ by way of example. $DP_5$ is shown to coincide with monitored point $MP_{F+1}$, but additional monitored points can be utilized and they can be at other positions.

Figure 3:
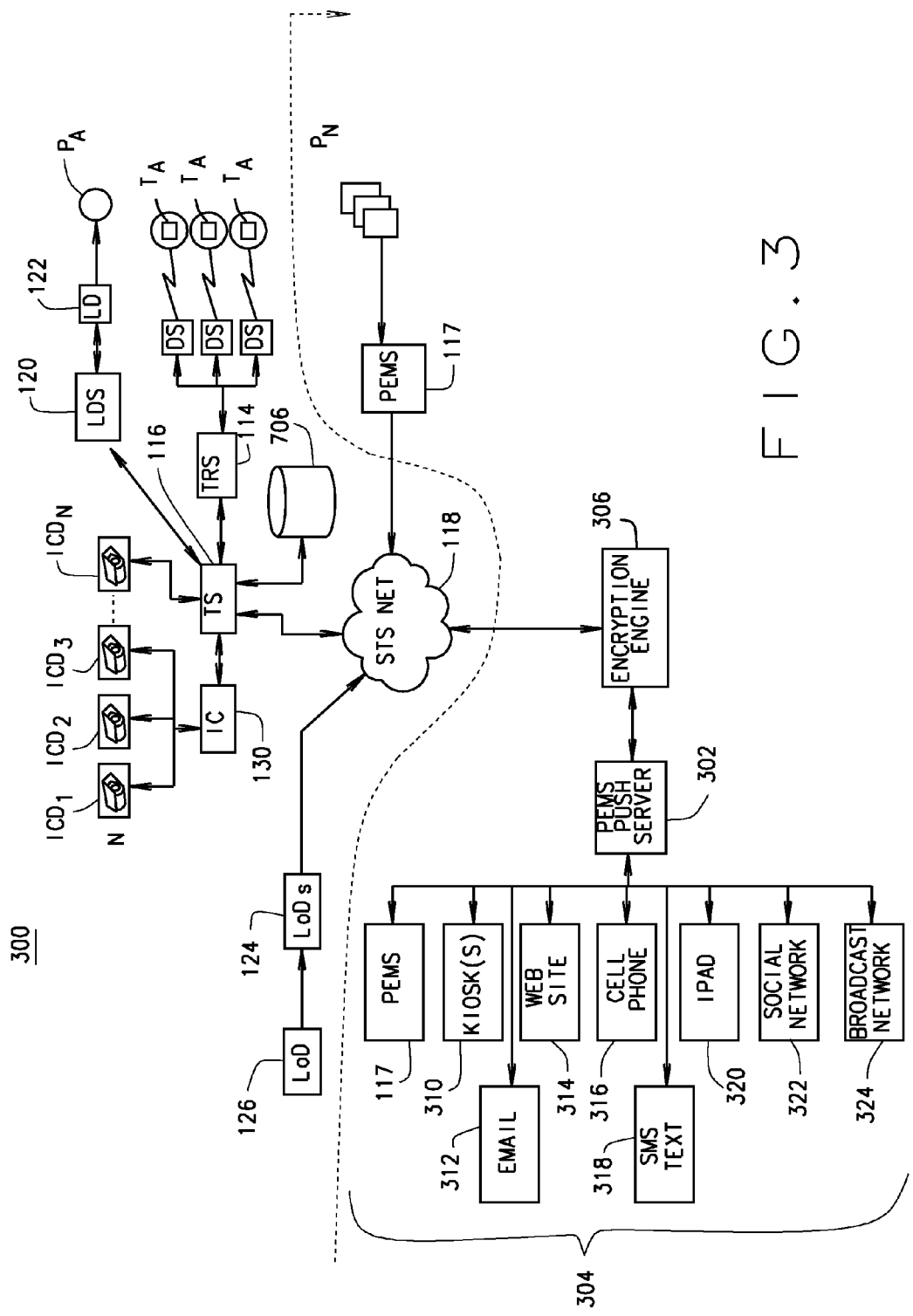
FIG. 3 is a block diagram showing the system architecture of a timing system (STS) with integrated participant identifier read triggering and/or laser detection triggering for capturing and associating a photograph or video according to one exemplary embodiment.

FIG. 3 illustrates a timing system architecture having an integrated timing system 300 that includes participant detection using RFID tag reads, laser detection and/or location determination for triggering the capturing and associating a photograph or video with a participant according to various exemplary embodiments. As shown in FIG. 3, in one embodiment a TS 116 has an image/video interface for receiving captured images through integration of image capture devices (ICDs) that are controlled by an Image Controller or Image Control System (IC) 130 for integrating with the timing system TS 116. The interface on a TS 116 can be wired, wireless, USB, Ethernet, by way of example. A timing system TS 116 can support multiple still or video image capture devices ICDs such as cameras connected via various interfaces. For example, in one embodiment, a single TS 116 can received between 4 and 12 image inputs directly and can support higher numbers such as 200 to 300 (such as 255) ICD cameras connected through remote TS devices using an TS interconnecting protocol. A remote device could be another TS system at a different timing/detection point such as at a different point along a racetrack or an assembly line. For example, a race or assembly line may have 5 timing points/detection points along the course or assembly line. One or more ICDs for videos or photos can be placed at one or more or all of each timing point and all such images can be sent back a single TS system 116 such as one at a finish line or main TS system for displaying on image displays or for transferring via a protocol to a webpage 314 and 322, mobile device 316, 320, sent to a KIOSK 310 or broadcast network 324, sent via a SMS text message 318 or email 312. These various captured image outputs 304 are managed by PEMS Push Server 302 or a module within the timing system 116 or related system. If an event such as a race, the race operator can display an image of a particular participant on a KIOSK 310 so that the participant or interested parties can see images of the participant passing a particular detection point MP, such as the finish line, on a TS announcement display, Kiosk 310, webpage 314, social network wall 322, or mobile device 316 such as a tablet 320, after the participant finishes the race. This can also be updated a wall on a social network wall 322 automatically as instructed or preorder by the participant or a third party. The IC 130 can capture single images as well as video streams and it synchronizes the capture images to the RFID tag read.

To provide additional interoperability, the system 300 can include an image encryption/compression system 306 or application that can encryption and/or compress the captured images and/or convert the format to a format as required by a selected or desired output 304.

Figure 6:
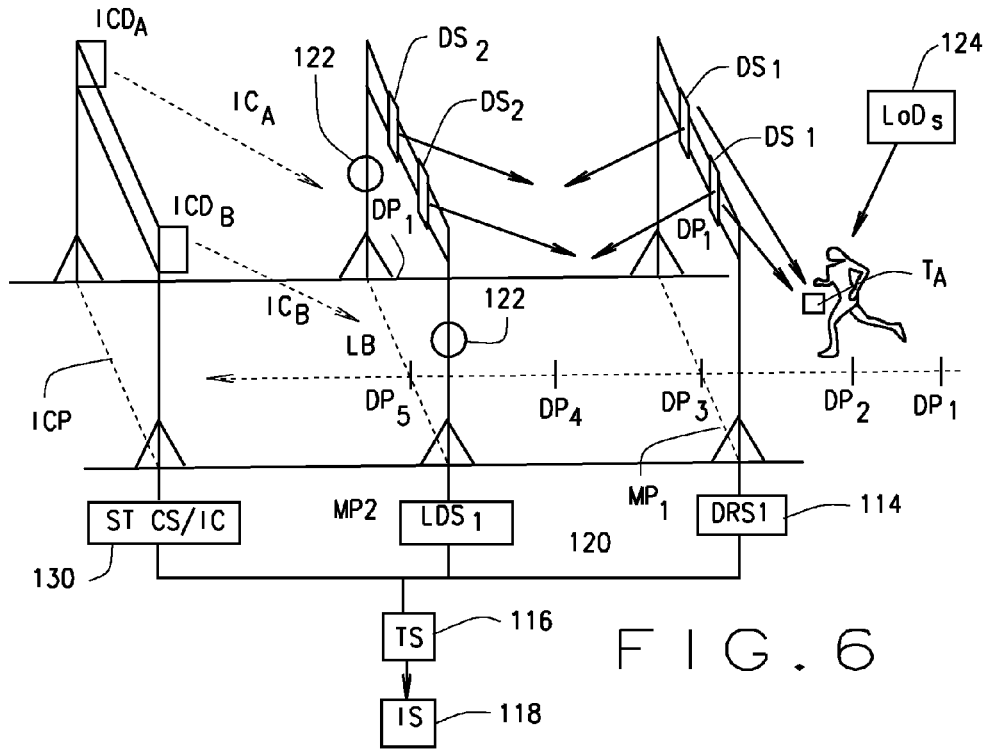
FIG. 6 is schematic illustrating a third layout of a course positioned image capture point having participant proximity detectors and a laser detection system, each positioned for triggering the capture and association of a photograph images or videos of passing participants according to one exemplary embodiment.
Figure 7:
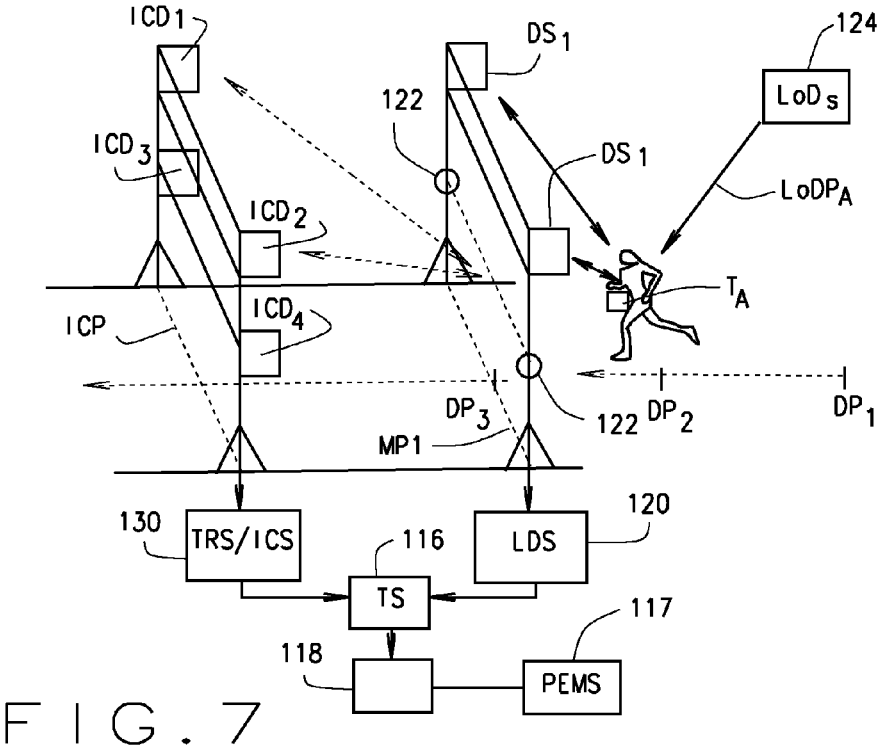
FIG. 7 is schematic illustrating a third layout of a course positioned image capture point having participant proximity detectors for participant identification and a laser detection system for triggering the capture and association of a photograph images or videos of passing participants according to one exemplary embodiment.

Also shown is the integration with the laser detection system LDS 120 that utilizes the laser detectors 122 for detecting the proximity of a participant at a monitored point MP as also shown in FIGS. 6 and 7. In these embodiments, the LDS 120 can be used to identify the proximity or passing of the participant P for triggering a capturing of an image or images. Further, as shown in FIG. 3, a location detection system LoDs 124 can provide the timing system TS 114 with a geographic location of a participant P through receiving a location from a location determination system LoD 126, such as the GPS system or a mobile device or mobile telephone network, by way of example.

When a participant identifier or tag $T_A$ tag is read, an image is also captured and the two are identified with a common participant number such as a RFID Chip or Tag. In other words, the TS 116 database has a field that contains a unique identifier that is typically associated with a participant such as a bib or contestant number. The RFID chip reads and any images or video are all commonly associated and in some embodiments, the image is associated with the RFID tag number of the associated RFID chip read.

The image or video file itself has a file name that contains a unique numeric entry that identified the image. For example, if a race occurs on Jan. 20, 2011 at 11:05:23.014 am in St. Louis, Mo. and the participant identification number (referred herein generally as a bib number) is No. 25, and the number 25 is read by a detection system at a start line, a photo can be captured of participant No. 25 P25 and the "captured image file name" (CIFN) for the image would be "photocap-012011-1105014-001-XX-STL." The first part of this file name represents the type of file . . . in this case a captured photo (photocap). In other embodiments, this could be a "videocap" for a captured video or other type. The next 6 digits of the CIFN are the month, day, and year in 2 digit representations. The next set of digits of the CIFN are HH:MM:SS.MMM with the MMM representing milliseconds, for 1,000th of a second timing accuracy, which is the time of the capture or could be the time of the RFID tag read. As shown in this example, the CIFN does not include colons such uses "-" as a delimiter. Of course other delimiters are also possible.

The next entry in the CIFN is for the camera position or camera identifier to uniquely identify which image capture device captured the image or video. This is shown as a 3-digit field and in one embodiment can include entries from 000 to 255, or more, or could be for more or less digits.

The next two digits of the CIFN are an indicator for the type of encoding and compression the file is using. Here this is shown as a 2-digit value that can represent up to 99 types of compression or encoding schemes, but other indicators are possible. The final CIFN entry is a variable length string that may contain any identifier for the event/race assigned by the user or STS operator. In this example, the identifier is STL reflecting that it was a St. Louis event.

In addition to static capture of photos and streaming video, the herein describe how the TS 116 with the integrated imaging capability enables an event operator, participants, or third parties such as the media or advertisers to such events to subscribe to image/video events and to receive photos or image streams in real time or subsequently. The described TS architecture makes it possible to provide live video feeds to anyone who has need for them. For example, if an event such as a race was being broadcast by a sports television channel, the broadcast company could receive photos or streaming video from the event.

In one exemplary embodiment, a plurality of image capture devices for capturing single images or video (generally referred herein simply as an image) with each being associated with a different detection point.

The image capture devices are integrated with the participant detection systems (DS) of a timing system TS so that an image is captured in coordination with a detection by a detections system (DS) at its detection point. The DS can be an RFID tag reader, laser detection system (LDS), or any other system that can detect the presence of a participant or object within the view of the image capture device (ICD), and can include, in some embodiments, the ICD itself.

The captured image is tagged and transmitted to a STS and stored, or at least a link/address/pointer is stored with the detection info or user info. I would assume that each stored image file can also be tagged as well as the user file including the pointer, at least as an option. The image can be stored with a file name that identifies it such that someone could see a list of file names and know which file (image) they wanted to review. also store a pointer within the user database record that points to the file image. This allows the user to pull up the results for a race participant and also view the images for that person.

The PEMS functionality is shown as 117, wherein some or all of a portion of PEMS 117 can be performed by the PEMS itself or by the TS.

Figure 4:
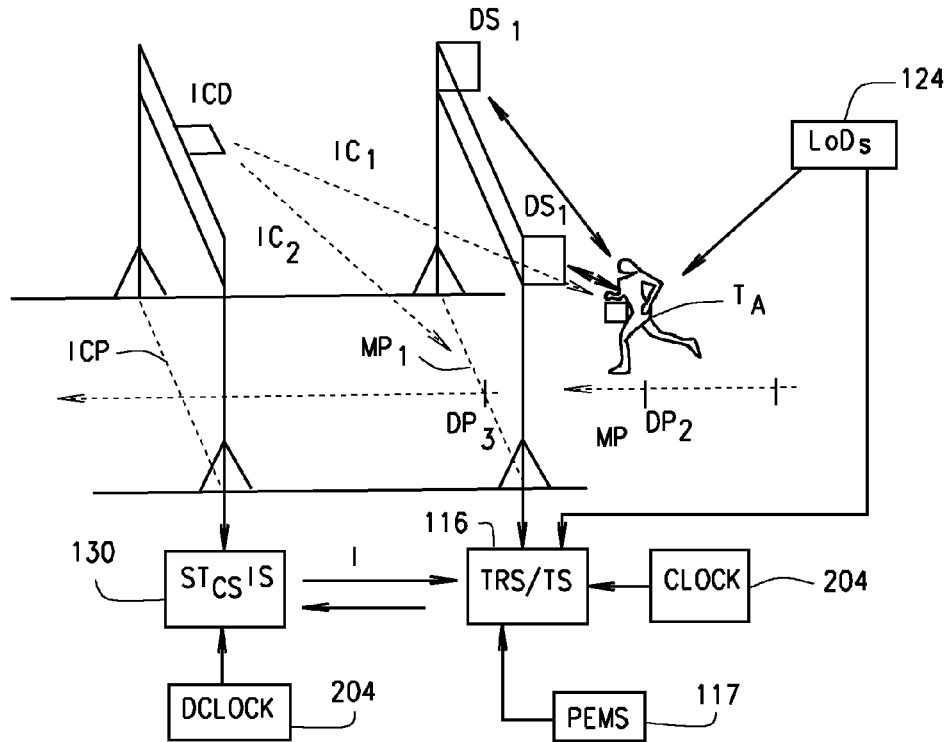
FIG. 4 is schematic illustrating the layout of an event course positioned image capture point having participant proximity detectors positioned for triggering the capture and association of a photograph image or video of a passing participant according to one exemplary embodiment.

FIG. 4 illustrates one exemplary on course layout of an event course having image capture devices located behind an RFID tag reader TRS 114 monitored point $MP_1$. In this illustration, the participant P is detected by the RFID tag reader detectors $DS_1$ at detection point $DP_1$ and then later at detection point $DP_2$. The TRS 116 or detection system $DRS_1$ 114 detects the participant's identifier such as an RFID tag number tag from tag $T_A$ and sends an image capture signal to the Image Control System (IC) 130 that controls the image capture device ICD located at image capture point ICP. As shown, a first image capture IC1 is taken after the participant is detected by $DS_1$ and TRS 116 at $DP_1$. A second image capture $IC_2$ is taken after the TRS 114 and $DS_1$ detect the RFID tag at DP2. The IC 130 transmits the captured images $IC_1$ and $IC_2$ back to the TRS 116 and/or the TS 114 wherein the images $IC_1$ and $IC_2$ are associated with the RFID tag numbers of the RFID tag reads or the other participant identifier numbers as may be applicable. As also shown, the location detection system 124 can detect a location of the participant such as GIS location data form a GPS device located on the participant P such as a mobile tracking tag $T_A$ or a mobile smart phone. The location detection system 124 is coupled to the TRS 114 and/or the timing system 116 for providing the participant location data thereto. The PEMS 117 provides the participant data including the participant number from the registration as well as an image capture request and information related to the desired image capture delivery or output location and format. FIG. 3 also illustrates the integrated clock 204 or timing systems for both the image capture controller 130 as well as the TRS 114 and/or timing system 116.

Figure 5:
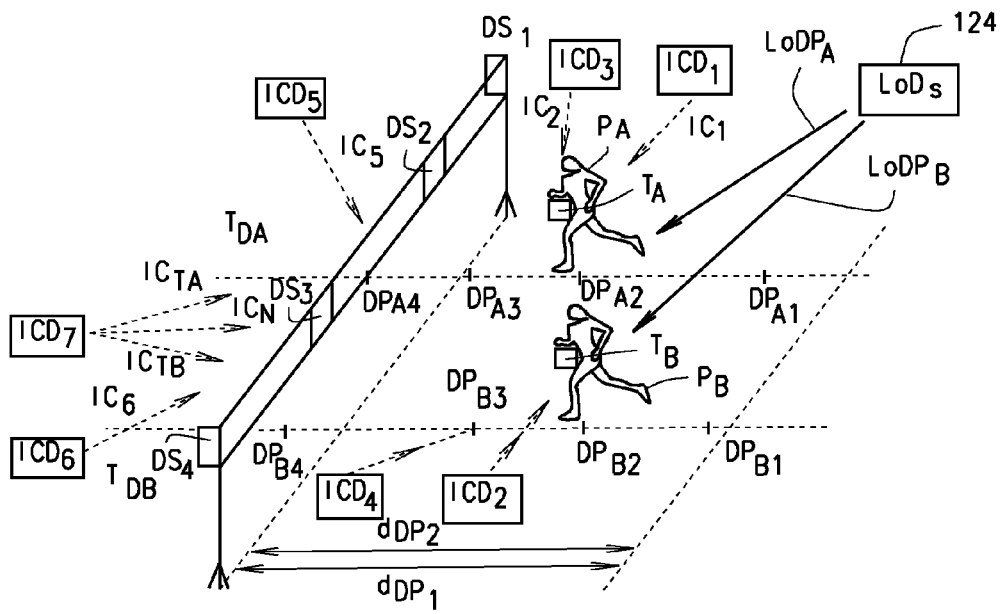
FIG. 5 is schematic illustrating a second layout of a system for an event course positioned at an image capture point having participant proximity detectors positioned for triggering the capture and association of a photograph images or videos of two or more passing participants according to one exemplary embodiment.

FIG. 5 illustrates a similar layout as FIG. 4, but having a plurality of image capture devices $ICD_1$ taking $IC_1$, $ICD_2$ taking $IC_2$, $ICD_3$ taking $IC_3$, $ICD_4$ taking $IC_4$, $ICD_5$ taking $IC_5$, $ICD_6$ taking $IC_6$, and $ICD_7$ taking $IC^7$. Also shown are a plurality of runners Pa and Pb, with each having a plurality of RFID tag reader or detection system detection points $DP_{AN}$ and $DP_{BN}$. In this exemplary embodiment, image capture device $ICD_1$ can be triggered by the participant $P_A$ being detected at $DP_{A1}$, then $DP_{A2}$ and on to $DP_{A3}$ and $DP_{A4}$. This progression supports not only the unique identification of participant A from the other participants, but also enables multiple images to be captured or for video of the participant to be captured. As shown, the distance of first detection can be $d_{DP1}$ and/or $d_{DP2}$, which can be as far as designed or technically capable. For instance, in some RFID detection systems this could be 75 feet. Multiple images $ICD_1$, $ICD_2$, $ICD_3$, $ICD_4$, ICD5, $ICD_6$ and $ICD_7$ can be taken of a single participant $P_A$. Participant $P_B$ can be similarly and uniquely detected by the detection system $DS_1$, $DS_2$, $DS_3$ and $DS_4$ and or location detection system 124 and where the participants number matches an image request, image capture devices $ICD_2$, $ICD_4$, and $ICD_7$ can capture various images $IC_2$, $IC_4$ and $IC_7$ at detection points $DP_{B1}$, $DP_{B2}$, $DP_{B3}$ and $DP_{B4}$ as the participant $P_B$ travels the route parallel with participant $P_A$.

FIGS. 6 and 7 provide two additional TS layouts each having a different architecture for image capture, but both using, in part, a laser detection system 120 for aiding in the triggering of the image capture, in addition to the RFID tag reads and the TRS 114 or TS 116 identification of the RFID tag numbers associated with each RFID tag and participant. Also, as shown in these figures, an alternative or additional location detection system 124 can provide a location determination $LOD_{PA}$ of each participant P. The location $LOD_{PA}$ of participant can be provided the timing system 116 for management of the image capturing as well as other features and services as described herein.

Figure 8:
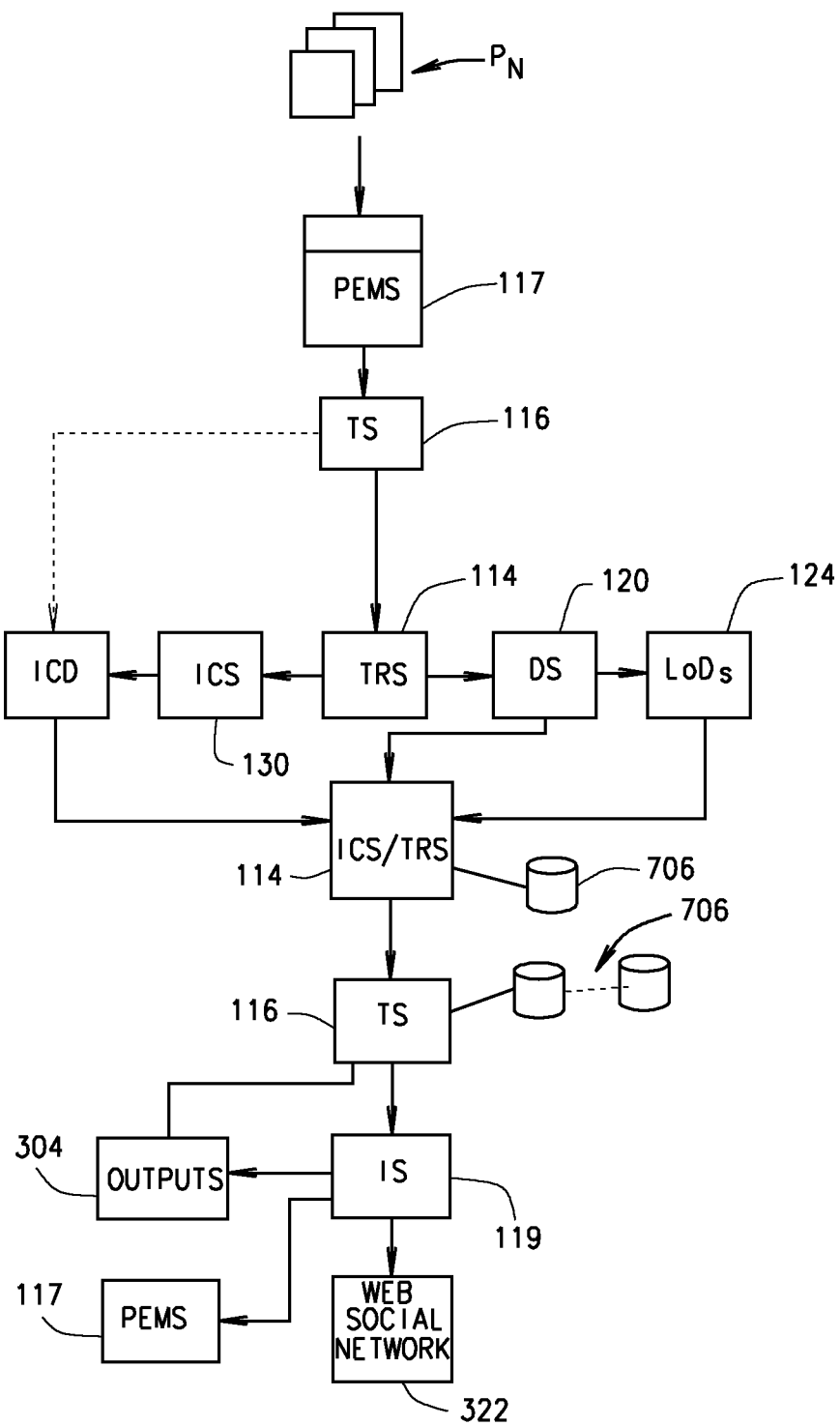
FIG. 8 is a block diagram flow chart illustrating a process for participant preordering of the capture and processing of event photographic images and/or video by a participant in an event according to one exemplary embodiment.

Referring now to FIG. 8, is a block diagram flow chart illustrating a process for participant preordering system PEMS that can be included as a part or all of the PEMS. As shown, in block PEMS, one or more requests are received for preordering of images either still or video. The request can include the identification of the participant for which images are to be taken, the number of images, the selection of the location for the images to be taken, and the desired delivery system or method for such image delivery. The delivery can be requested as being during an event or following an event. The delivery sites or locations are shown, by way of example, in FIG. 3 to include a local Kiosk, a website, a cell phone, a tablet, or could include a broadcast channel such as a network broadcast station. The PEMS 117 provides the request to the TS 116 for the planned capturing, processing and delivery of the preorder images of the particular participant by participant identifier number such as an RFID tag number as provided in the request from the PEMS 117. The TS 116 can provide this information to the RFID tag reader 114 as well as the image capture controller 130 in some embodiments. The TS 116 is coupled to the TRS 114 for receiving detections or tag reads and receiving a detection of the participant in proximity thereto.

The TS 116 identifies the detected participant having preordered an image capture and send an instruction to the image capture system 130 and or the image capture devices ICD. The timing system can also provide this information to the TRS 116 that in turn provides the instruction for image capture upon detection directly to the image capture system 130. The TRS 114 receives an RFID tag detection that is the RFID tag number of the request and can trigger the capturing of the image of the particular participant by one or more ICDs. In alternative or additional embodiment, the laser detection system 120 detects the passing by a monitored point and can trigger the capture of an image of the participant detected thereby. In other embodiments, the location detection system 124 can provide the location of the participant P to the timing system 116, the TRS 114 and/or the ICS 130 for triggering the capturing of the image based on a determination by such system that the participant is passing a point or location for which an image capture is desired or is consistent with the image request. Once the ICD takes the requested image or video of the particular pre-identified participant based on the identification by the TRS 1114, the captured images and the TRS tag reads with the RFID tag numbers can be stored in memory 706 locally or provided to the TS 116 where they are stored in memory 706 such as by their participant identifier numbers such as RFID tag or bib numbers. Subsequently, the TS 114 can transmit the stored image data to an imaging system IS 119 or to the PEMS 117 or directly or indirectly to outputs 304, such as, by way of example, the participant's social web page or wall 322.

Figure 9:
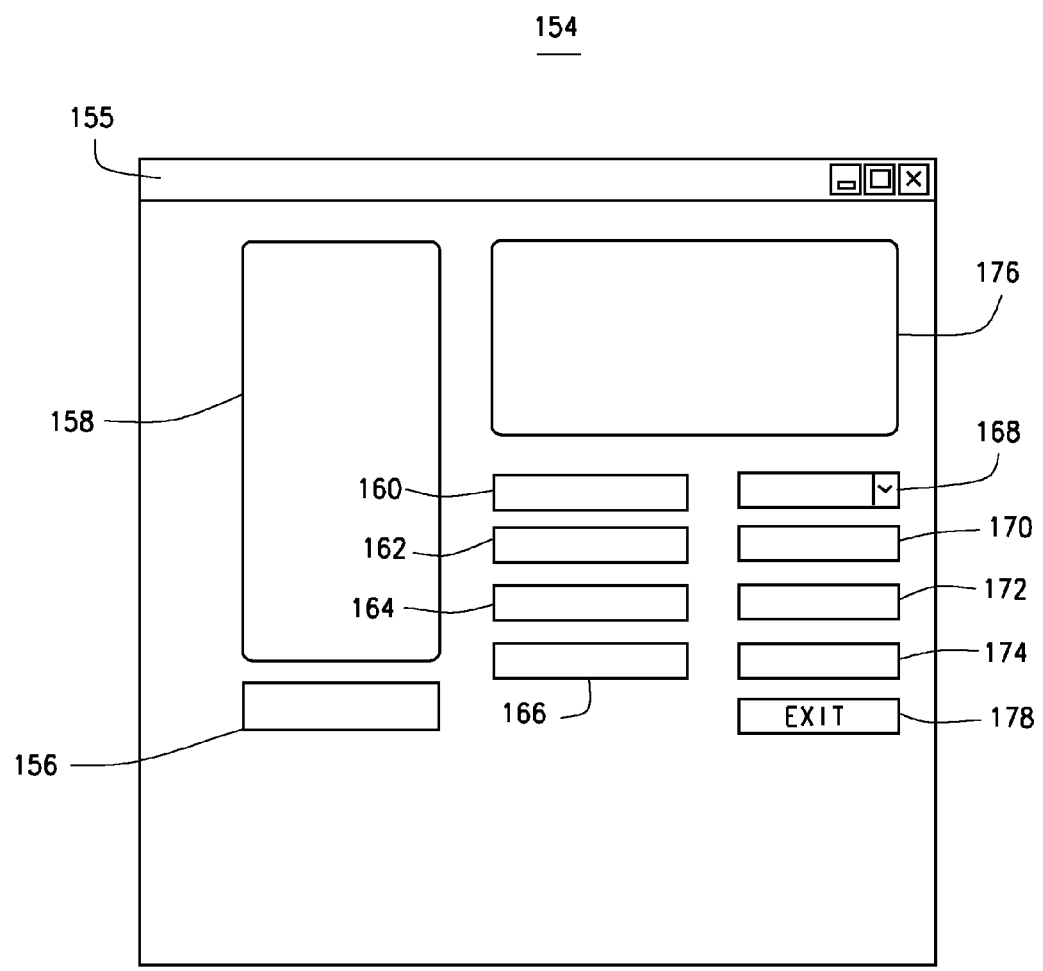
FIG. 9 is a user interface for a timing system TS for receiving user data entries according to one exemplary embodiment.

FIG. 9 illustrates one exemplary embodiment of a user interface for PEMS 117 for receiving manual data entries from a user according to one exemplary embodiment. As shown in FIG. 9, the PEMS 117 can include a user interface 154. The user interface 154 can include a user screen 155 can include be a text box 156 on the left side of the screen 155. The participant can enter his name in 158 or identifier such as a bib number from a prior race in 155. As the user types in his name or number and other user data, the PEMS system registers the participant and assigns the participant a participant identifier number. Display area 176 prompts the user or provides the user with instructions of further information on possible selections. The PEMS 117 can also receive an input from the participant either at the time of registration or at any subsequent time prior to and during the event, for various services or options via selection of predefined buttons, 160, 162, 164, 168, 170, 172, and 174. These can include the selection of particular optional packages offered for the event including image captures and the types of image capture and formats. the participant can be directed to input into 158 their output addresses or information and as payment for any optional services. The user screen 155 can be adapted for webpage browsers for computers, tablets, or smart phones. A logout or exit button can also be provided.

The PEMS 117 user interface 154 receives the request for an image capture from the participant or possibly a third party where allowed to by the participant. The image capture request can request the number of images captured, the amount of video captured, the locations for which the images are to be captures, as well as the desired outputs 304 such as addresses thereof. The participant can then also be prompted to pay for such image capture requests by prompting for payment via credit card or other means. The PEMS 117 via a user interface as shown in FIG. 9 or any other suitable user interface can collect the participant information, establish the participant for an event, and then provide such information along with any image capture request, payment verification, image capture output addresses and selections and formats, to the timing system 116.

ITS NET

Figure 10:
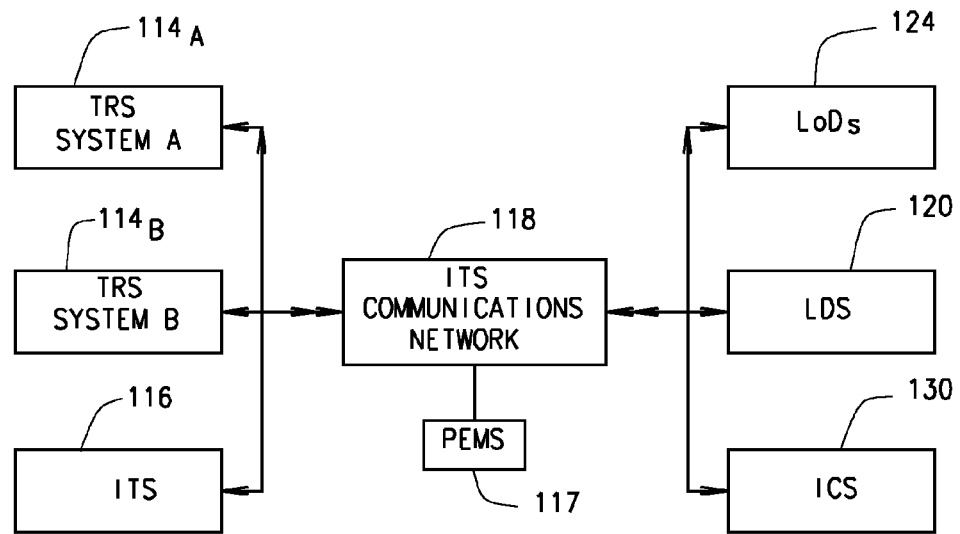
FIG. 10 is a high-level architecture of an Integrated Timing System ITS having a timing system TS with plurality of automated tag reading systems and at least one PEMS system according to one exemplary embodiment.

FIG. 10 is a high level architecture of an Integrated Timing System ITS having timing system TS 116 each of which may have detection systems 1164A and 114B that are tag reading systems 114 (shown as 114A and 114B), coupled to a PEMS 117 via ITS NET communication network 118. Also the ITS 116 and TRS systems 114A and 114B can communicate with location detection system 124 or laser detection system 120 in support of participant proximity detection and in support of image capture services and other related participant services consistent with this disclosure. Further image capture controller 130 provides the interface for capturing the instructed images and delivering them to the ITS 116 or other specified destination.

ITS NET Cloud Architecture

Figure 11:
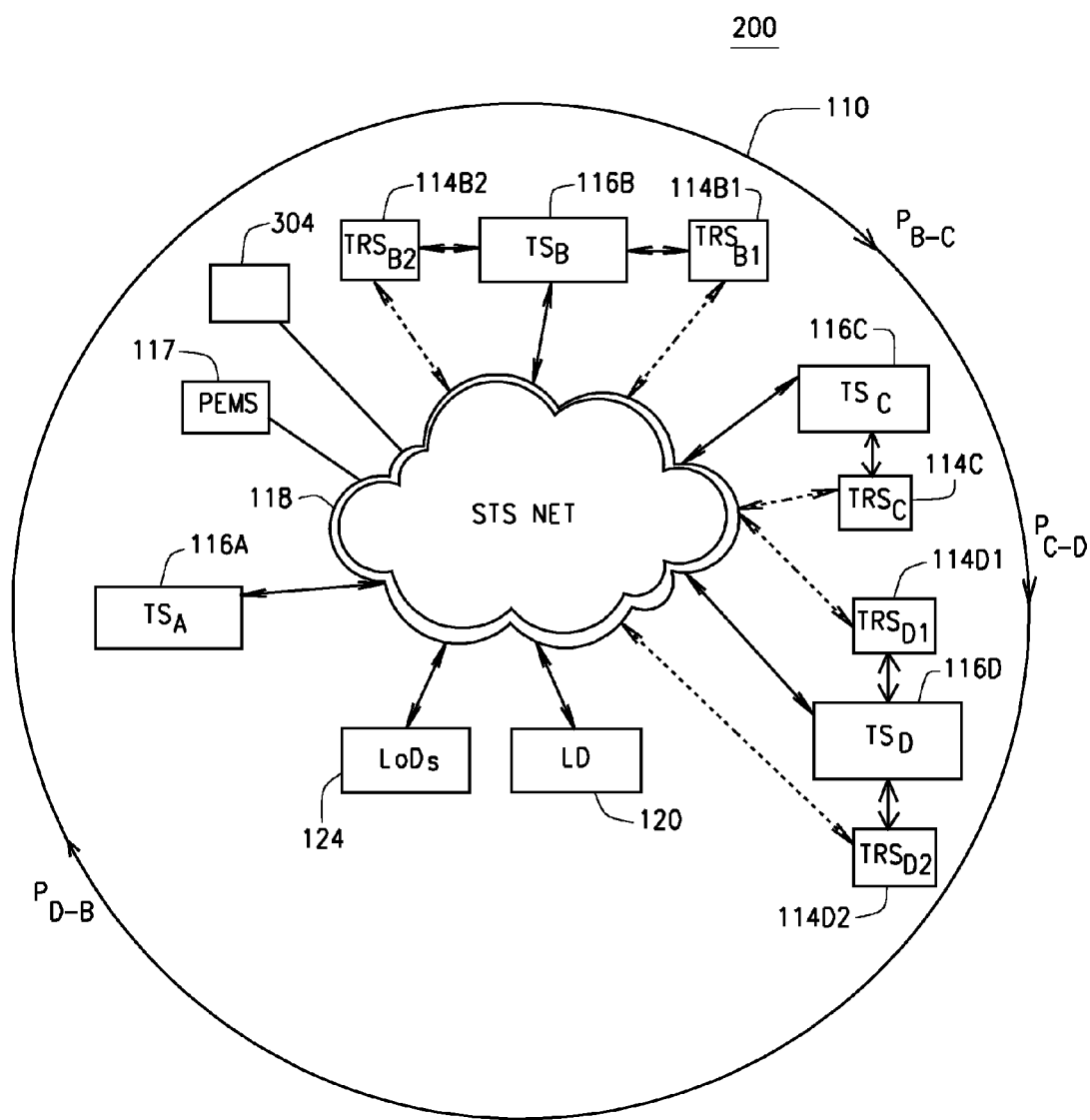
FIG. 11 is a schematic drawing showing the system architecture of the communication system suitable for use with one exemplary embodiment.

FIG. 11 is a high level architecture of an Integrated Timing System ITS having one or more timing systems TS each of which may have one or more RFID or other automated tag reading systems 114 (shown as 114A and 114B), a timing system 116 and a plurality of PEMS 117 that are the remote entry systems. The system communicate over the ITS NET communication network 118 and the PEMS system 117 communicates with the other ITS 116 systems over the ITS NET communications link 152. As illustrated, multiple ITS systems 116 can be used on a communications network 118 to send participant information to any one of several TS RFID Systems TRS 114 or to the TS 116. Each TS TRS 114 can be configured to interface with PEMS 1117 and can be addressed individually through a configuration option in the PESM 117 that allows the PEMS user to request image captures as well as to define the outputs 304. FIG. 10 illustrates that each ITS 116 and TRS system 114 can communicate or include a location detection system 124 or laser detection system 120 in support of participant proximity detection and in support of image capture services and other related participant services consistent with this disclosure.

As shown in FIG. 11, $TS_A$ 116A is implemented via communications system 118 with $TS_B$ 116B having two $TRS_B$ systems $TRS_{B1}$ $114B1$ and $TRS_{B2}$ $114_{B2}$. Next the system 200 also has $TS_C$ with a single $TRS_C$ $114_C$ system. TSD $116_D$ has two $TRS_{D1}$ $114_{D1}$ and $TRS_{D2}$ $114_{D2}$ participant detection systems.

ITS with PEMS

Figure 12:
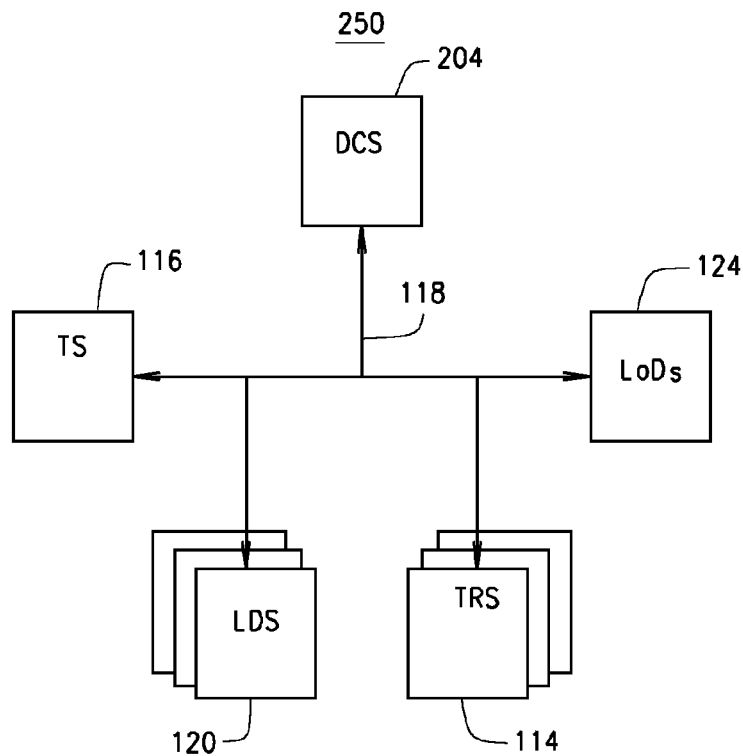
FIG. 12 is another high level architecture of an Integrated Timing System (ITS) having a plurality of automated tag reading systems and at least one PEMS system according to one exemplary embodiment.

FIG. 12 is schematic drawing showing the communication interfaces for an integrated timing system ITS with a timing system TS 116 and tag reader system (TRS) 114 configured for compatibility with a PEMS system 117 according to one exemplary embodiment. A typical PEMS 117 to TS 116 and TS 116 to PEMS 117 communications architecture 250 can include a Distributed Clock System DCS 204, one or more timing systems TS 116, PEMS 117, a location detection system 124 and a laser detections system 120. The PEMS can include any type of computing platform without limitation.

ITS Message Protocol Structure

FIG. 13 is an illustration of the format for the variable length TS to PEMS packet message messages according to one exemplary embodiment. As shown, FIG. 13 illustrates a variable length message information packet structure that is used to communicate event data. This packet may contain any type of information and the format of the packet includes the following: message type, source, custom field(s), and end of message indicator. Several message types are already defined, as documented below. However, the message type may contain any text that uniquely identifies a message. The system receiving the message will use the message type to determine the action required. The next field in the packet includes the source. The source is a name or unique identifier that indicates which system transmitted the message. This information is used by the receiving system to know where to send a response. The source field can include any text, but typically the IP address of a computer or device is used. The next fields within the packet are customer fields that may contain any type of information. The flexibility of the protocol makes it possible to send any type of information from one system to another. The final field that should be included in each information packet contains EOM|. This is the end of message indicator that is used by the receiving system to know when all information within a packet has been received. The packet also uses the | character to delimit each field.

METS Protocol Flow

FIG. 14 is an illustration of the formats for an exemplary set of METS messages according to one exemplary embodiment. There is shown the predefined information messages provided within the protocol. The following describes each message:

(A) Read message (READ). This message can be sent from a system that has just read a participant tag or other participant identifier. The message could be sent to any other device(s) and the message includes the tag serial number just read. It also includes the time of the tag read as well as an optional packet number. The READ message is the primary information packet used to communicate tag read data to all devices. The packet could be expanded to include additional fields as necessary.

(B) Read message (READ). This message can be sent from a system that has just read a participant tag or other participant identifier. The message could be sent to any other device(s) and the message includes name of the participant that corresponds with the tag serial number just read. It also includes the time of the tag read as well as an optional packet number. The READ message is the primary information packet used to communicate tag read data to all devices. The packet could be expanded to include additional fields as necessary.

(C) Re-send message (RESEND). This message can be sent from a receiving device to a transmitting device to request another send of a particular packet. If packet numbers are being used for the purpose of verifying that all packets are received, the re-send message can be used to request another transmission of a packet that never arrived at the receiving device. The packet could be expanded to include additional fields as necessary.

(D) Time Sync (TSYNC). This message can be sent to all devices on the network to indicate the current time at the transmitting device. This message is used to synchronize the time on all devices, which is crucial for RFID systems that are used for timing sporting events.

(E) Look up (LOOKUP). This message allows a device to request race information from another device. The identifier may be any text. In most cases, the identifier will be a tag serial number, race bib number, participant name, or perhaps a unique identifier that refers to a particular type of information. For example, if a device needs to know the current duration of a race, the LOOKUP message could be sent to a time system that is tracking the total race time. The identifier field might contain the text entry "RACETIME" and this entry could be used to indicate that the race duration is desired. The packet number field is optional and if not used, the field could contain a single space.

(F) Command. This message could be sent to a device to request that a particular command be executed. The IDENTIFIER field may contain any text desired. This field could be used to send any tag reader or participant detection system command to a remote device. For example, if the current battery charge level on a remote system needed to determined, a Command message could be sent with the text BATTERYSTATS in the IDENTIFIER field. The remote system would need to have functions built in that can process the command.

(G) RSIG. The RSIG message is sent using PEMS-TS to any system that is listening for RSIG command. This is typically used by ITS PEMS to make sure the connection over the network is good to PEMS-ITS and also to verify that PEMS-ITS is scanning and listening for PEMS entries.

(H) RQIMAGE. The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a METS system where a file is located.

(I) STIMAGE. The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located.

The STS-ICS facilitates and streamlines the communication of tag reader or participant detection system timing information between multiple computers used at sporting events. The protocol is flexible and adaptable and can be used to transmit any type of information across any type of network. The use of variable length messages makes it possible to customize the messages sent or received from any type of device. The protocol is simple and efficient and can be quickly implemented.

The foregoing descriptions of specific embodiments of the present design have been presented for the purposes of illustration and description. They are not intended to be fully exhaustive or to limit the design to the precise use, form, or methods disclosed, and it is obvious that many modifications or variations are possible in the light of the information provided above. The embodiments were chosen, shown, and described in order to best explain the concepts and principles and the practical application of the design, thus providing others skilled in the art the ability to best utilize the design and various embodiments with various modifications as are suited to the particular use desired.

TS to PEMS Output File

The TS system can be configured when equipped for PEMS to allow the user to define the output file that will be used to store METS received chip reads coming from the METS reader. The METS Remote Output File can be a standard text file that contains some basic information including the number of the antenna that last read the chip, the chip number, and the time of the read. This output file can be read by Microsoft Excel, any text editor, and virtually any database. The file is really used as a backup in case of a system failure. The output file can be used to reconstruct a database. For example, if the user has the own SQL database engine and the user wish to record the chip reads in that database, the user will want to use this text file. In addition, if the user is using a third-party race scoring system such as Race Director or Runscore, this file will be helpful to the user since both programs can read it directly. Most users can simply use the built-in database within the ITS. It will automatically manage the complexities of race timing and save the user a lot of effort.

Output File Merle Report

This report is a very powerful and sophisticated tool that is rarely used for most races. However, its purpose is to provide extreme levels of redundancy for chip timing at events in which the user want to maximize the chip reads at a finish line.

A single TS at a typical finish line for most events should read well as long as the chip is being worn properly and is actually on the participant. When a second the TS system and/or TRS used at a finish line, the combination of the two systems greatly enhances the chances of reading the timing chips. Nonetheless, it is still possible that a missed chip read could occur. This can happen because the chip may have been accidentally damaged by the runner, or perhaps the chip was accidentally removed from the bib or other surface where it was placed. If the user has timed enough races, the user knows that strange things happen that are often out of the control. Nonetheless, the user may need to time a race in which it is critical that the user maximize the read success. Thus, the user has an option that will improve the read success.

To guarantee maximum redundancy and success at this unique race, the user will also have an operator at the back of the finish chute that is using a Remote Entry Software (METS) to simply enter bib numbers for every person that has finished the race. This extra operator is simply making sure that every participant's race number has been keyed into the system. If any runner has lost their bib number, the operator can simply key in their name as well. The result is that the user has an output file being created by this backup operator that contains a list of bib numbers.

The Output File Merge Report scans the output file created by at the finish line, looking for entries that contain a 0 for the bib number. In other words, it finds every entry that the operator made at the finish line when they could not see a bib number and simply pressed the Enter key. When they pressed the Enter key without a bib number, a 0 was written to the output file along with the time. Thus, has a finish time, but now needs to figure out who belongs with that finish time.

It now scans the Output File that came from the computer running the METS software. The user will actually copy this file from the computer onto the hard disk of the TS at the finish line. The report now matches up the race finishers based on numbers and times and reconciles the two output files. The result of this complex but quick process is that the user will have a new output file. This file contains the combined results for the race with all the bib numbers of all of the participant contained in it. The user can then load this output file into the TS as the finish times for everyone in the race. The user could also load this file into a spreadsheet or any other program.

TS Database File

The TS system can include a high-speed binary database that runs in memory and is updated very rapidly when chips are being read. When this database is saved to the disk drive, it is written to a text file using a comma-delimited format. This allows the file to be read by third-party programs without having to build a complex database interface. For example, Microsoft Excel or Notepad can directly read the file.

The following is a sample database file record: 1,Jay Cooper,08:00:00,08:15:00,00:00:00,00:00:00,00:00:00,08:45:00,00:45:00,50,Half Marathon,M,Allentown,Team Cooper,50001,Club Member,#76435,137.

The TS system can have the capability to automatically write out the database during a race to a file name selected by the user.

The following is one exemplary format for the database file: Bib#,Name,StartTime,Split1,Split2,Split3,Split4,FinishTime,ElapsedTime,Age,Division,Gender,City,TeamName,ChipField,UserField1,UserField2,UniqueID.

The Bib # field will contain a value from 1 to 99999 depending on the version of the TS system in use.

The Name will contain the full name and is typically formatted as FIRST NAME LAST NAME with no comma between the first and last name. The user should not include a delimiter of the TS system in this field. If the TS system uses a comma for example, the user should not include a comma in the name field, of course other delimiters are also possible. When the TS system loads the database file, it uses the comma to determine the individual fields. Thus, if the user place a comma in the Name field, the user will cause TS to use the wrong fields for the remaining entries on the line being read.

The following fields all contain a time based on the time of day: Start Time, Split1, Split2, Split3, Split4, Finish Time. All of these fields are in the format HH:MM:SS and there are no quote marks.

The Age field will contain up to three digits typically ranging from one to 100. The Division field will contain a text entry that can be up to 250 characters in length, although it is typically 20 or less characters long. The Gender field will contain a text entry that can be up to 250 characters in length, although it is typically one character with either an M or F entry. The City field will contain a text entry that can be up to 250 characters in length, although it is typically 25 or less characters long.

The Team Name field will contain a text entry that can be up to 250 characters in length, although it is typically 25 or less characters long.

The Chip field is reserved for a future update. It will contain a text entry that can be up to 250 characters in length, although it is expected to be six or less characters long.

The UserField1 field will contain a text entry that can be up to 250 characters in length, although it is typically 25 or less characters long. This field may be used by the software to contain values related to team order for relay races. In some embodiments, the user will place information in this field related to the user's personal information such as emergency contact number.

The UserField2 field will contain a text entry that can be up to 250 characters in length, although it is typically 25 or less characters long. This is a second field that often contains additional personal information about a race participant.

The UniqueID field will contain a text entry that can be up to 250 characters in length, although it is typically 10 or less characters long. This field is often used to track race-day numbers or other unique values that identify a race participant. TS can automatically insert a unique value in this field during the rapid registration process in the software.

Not only will TS write this text file to the disk drive, it will read it back in. Thus, the user could create a database file using this format and the TS system may read it just fine. It is important to make sure that any time fields the user creates are in the HH:MM:SS format with leading zeros on any times that are less than 10. For example, if the time is 9:10 am, the field should contain the entry 09:10:00. In most embodiments, if the user are creating a new file that will be loaded into TS, the time fields should contain 00:00:00. However, if the user has a race with assigned start times, the user could load them into TS as well by using the StartTime field.

ITS NET Protocol Messages

Generally, as described herein, an ITS compatible component or system can have a state-less UDP network interface that is used for outbound and inbound messages. These messages include outbound packets from TS for READ information, as well as other data. In addition, the ITS component can listen for messages from other ITS systems or third-party programs. This interface allows third-party programs to be developed which can work within the ITS NET architecture.

Network and Web Settings

In order for ITS NET compatible component/system to communicate messages from any ITS system or component, the ITS NET compatible component/system should have the network values set in the communication program software. The ITS NET compatible component/system has a powerful networking protocol that allows the user to interface to third-party applications, programs the user may have written, and to a number of add-on software programs that provide enhanced functionality. The networking options allow the user to define specific locations and networking interfaces that will be used to provide real-time race information including chips read as well as race participant information. These settings should not be changed unless the user has a complete understanding of how interfaces with third-party programs.

ITS NET Compatible Component/System Sockets

As ITS NET compatible component/system is processing messages coming from another ITS NET compatible system, it may determine that an error has occurred in the message that was received. If this is the case, it will request that TS send the message again. To do that, it needs to know the Socket Value that the TS system is listening on for inbound messages. In the Defaults screen of TS, there is a value set in the Listen Socket box. That value should be typed in the Sender Socket box on this ITS NET compatible component/system configuration screen.

When the TS system is communicating with other systems, it sends that information to an address on the other computers. That address is called a Socket in the networking world. The software running on another computer advertises that it is listening for messages on a given Socket. It is much like the telephone system. The user has a phone number that other people can call. In essence, the phone number is much like a socket in the TS system. If someone sends information to the socket, the user will receive it. Thus, for the TS system to send information to a one or more ITS NET compatible component/system, the TS system component tasked with such communication needs to know what socket that ITS NET system is listening on. Thus, the Remote socket is like the phone number for each ITS NET system.

For example, the Remote Socket for a PEMS system can be 6000. In other words, the PEMS system will be listening on this number for any messages sent from an ITS system component. All PEMS systems can listen on the same Socket and thus they can all receive the same message. In other words, the TS user instructs any ITS system that wants to transmit a message to a PEMS system to transmit it using the Socket 6000. Similarly, each PEMS system can also be programmed to transmit to one or more other ITS components based on their Socket address. For example, a primary TRS systems can have a Remote Socket address assigned such as Socket 6010, the secondary TRS system set for Socket 6020 or it can be assigned the same as the primary at Socket 6010. The TS system can have a different Socket 6200, but can also be programmed to listen to Sockets 6010, 6020 and/or 6000, to monitor all traffic and communications.

However, it takes more than just a Socket value to reach an ITS system component such as a PEMS system. It also takes an IP address. For example, at the TS system there can be an input for identifying the IP address for any of the ITS system components including the PEMS system. For the PEMS system, for example, the TS system user can enter an IP address for the PEMS system as Remote Name/IP associated with the Remote Socket for the PEMS system. The user needs to enter into the TS system the IP address where the user wants the message sent. Think of the IP address as a long area code in our telephone analogy. The TS system needs to tell what part of the country the message should go to. In the networking world, an IP address looks like the following: 192.168.1.100. It is usually four different numbers with a period between them. These numbers define where in the world the user wish to send the message. In most embodiments, the user will be focused mostly on the last number, which can range from 1 to 255. This last value actually defines which computing platform that is attached to a local network the user wish to reach from among the plurality of computing platforms/computers. For example, if the MESTS user is using a laptop is connected to the TS system via a Wi-Fi router, the user might be assigned number 120, and the full IP address might be 192.168.1.120. In an exemplary embodiment, if there are more than 255 computers on a network, the previous digit might be changed from a 1 to a 2. Thus, if one wanted to reach computer number 350 in a company, the user might need to use an IP address of 192.168.2.100 as that would be the location of the computer on the network. Notice the third value was changed from a 1 to a 2. As the user should know by now, these last two number ranges can support up to 255×255 total computers . . . about 65,000 total PCs.

In most embodiments, the ITS system related network will have less than 250 computers, so most of the present embodiments are concerned with the last digit in the IP address. If the TS system user wants to only send messages to one ITS system component such as a PEMS, the user can place the IP address for that PEMS system computer in the Remote Name/IP field. However, the address for the PC could change every time it is powered up, if so set the last digit to 255 and the message will be sent to all PCs on the network. The value of 255 is special in networking and it means to send the message to everyone, thus anyone on the network of 192.168.1.XXX will receive the message. That works just fine because the TS system is also using the Socket value to make sure that a receiving PC knows that the message is also for them. The Remote Socket and the Remote Name/IP work together to tell how to communicate with other systems.

The TS system can be configured to include define each ITS and/or PEMS location by entering each particular IP address that contains the name the ITS component such as the PEMS system associated with the IP address. This can be used by the TS system or other components thereof to provide additional information related to a received chip read. For example, this can be used to identify that the chip read was received from a particular PEMS system, versus another PEMS system or versus a TRS RFID tag reader at the primary or secondary points. For example, if the user is using at a split point on the course called Split 1, the user can send the chip reads over the network to the primary system at the finish line and the user may wish to have them stored in the Split 1 column Thus, the user could use the My Location entry to Split 1. If the user is using to send chip reads to another ITS component, the user can place the word Finish in this column and it can be used by that system, such as for a display or otherwise This explanation also applies to the Listen for Messages Enabled box. The user will simply check the box and tell it can receive messages from other systems.

As addressed above, each ITS system can be programmed to listen to one or more Sockets on the communication network. The listen socket instructs the TS system component such as the PEMS system to listen for messages on that socket value. These messages may include chip reads or other types of data as will be discussed in more detail below.

The Listen Socket value is the network number that PEMS will use to listen for messages. In the networking world, there are unique addresses much like a street address for the home. In order for software programs to reach another program over the network, it needs to know the address of the destination. The number of addresses in a network can be quite large, but PEMS will restrict the number range to a value from 5,000 to 9,999. This would allow the user to have up to 5,000 PEMS systems running at the same time. In one embodiment, PEMS comes pre-set when the user purchases the TS system to a value of 6000, but the user can change that at any time. In this exemplary embodiment the value 6002 is used since by design choice the TS system defaults are set to this value at the factory to send information to any program listening on 6002. As known to those of skill in the art, the user could change these values to any number from 5,000 to 9,999. When the user enter the value, some embodiments should not include commas as the TS system as a common can be used by the TS system as a delimiter. Simply enter the value, such as 6000. The value the user use for the Listener Socket should match the value set in the TS defaults for Remote Socket. For example, in one embodiment an TS system can have a default value for Remote Socket set to 6000. The user would set the Listener Socket in PEMS to 6000.

As a quick summary of the Listen and Sender socket settings for PEMS:
 1. The Listener Socket value in PEMS should match the Remote Socket value in the TS Defaults screen.
 2. The Sender Socket value in PEMS should match the Listen Socket value in the TS Defaults screen.

Once the user has confirmed these settings, the user can next make sure the IP Address is set properly for the PEMS software.

ITS NET—PEMS IP Address

In the last couple of sections, the address for the network communications was discussed. Not only do software programs listen or send information using socket numbers, they need to know which computer is going to receive their messages. It turns out that a single computer could actually have two or more programs running at the same time, which are listening for messages on different sockets. The address mentioned earlier is actually specific to a software program, and not necessarily the computer where the software program is loaded. So, not only does the ITS system need to use a socket number (address for the software program), the ITS system also needs to use an IP address.

The IP Address value should be set to the IP address of the primary TS at the finish line. The user can determine that address by using the System Info option in the Help Menu of TS. PEMS needs to know this specific address so it can communicate over the network with the ITS. Recall that it was previously mentioned that if PEMS receives a message that is incorrect, it would request that TS re-send that message. Thus, PEMS needs to know the IP address for the computer running the TS software.

In the networking world, IP addresses are usually formatted to look something like 192.168.100.105. There are four numbers ranging in value from 1 to 255 and they are separated by periods. This number is the computer's unique network address in the world!

If the system user wants to run the PEMS software on the same computer as TS, the user could enter the phrase localhost in the IP Address box. This word, localhost, is a special way of telling the PEMS software that the TS system is running on the same computer. The user can also set the IP Address in the TS Defaults to localhost for this to work.

This concept of using localhost can be very helpful if the user is using a single computer for training or for doing a demonstration.

Another advanced use of the IP address has to do with Broadcasts. In the networking world, the user can tell a software program to send out a message to all computers on the same network. To do this, the user simply set the last value in the IP address to 255. The value of 255 is reserved and designated to be used for messages that should be sent to everyone.

Here a network IP address is set to 192.168.100.255. The last value is set to 255, so messages will be sent to any computer on the 192.168.100 network. That means that computers that are designated as 0.1 to 0.254 will receive messages sent. For example, 192.168.100.50 would receive messages. 192.168.100.165 would also receive our messages. Because these two computers have ending addresses that are within the range of 1 to 254, they will receive our broadcast message that is being sent with an address of 255.

If a computer had an IP address of 192.168.120.40, the system would not receive the messages from the TS system. The user sees, although the last value in the address is 40, the value just to the left of that is 120, which indicates the computer is on a different network. In summary, the first 3 values in the IP address identify the actual network location, and the $4^{th}$ value designates the computer that happens to be on that network. The user may want to set the IP address in PEMS to have a $4^{th}$ value of 255 when the user has written his own software to communicate with PEMS.

Exemplary TS-PEMS Messaging Packet Structure

UDP packets are ideal for use with the TS to PEMS network interface as they are quick and relatively easy to implement. However, there are well-known limitations for UDP packets, and the user should be completely familiar with these limitations before the user attempt to write software that interfaces with the ITS system.

The following includes the packet structure for an exemplary PEMS supported UDP packets. The TS and PEMS configured as an ITS component can be configured to listen and send on any socket ranging from 5000 to 9999. In addition, TS can be set to send to a specific computer by using either the computer name or its IP address. Furthermore, TS can send to all computers on the network by using 0.255 as the last bytes in the IP address. For example, if the user set TS system to 192.168.1.255, it will send its messages as Broadcast packets. All ITS message are sent as clear text contained within the UDP packet, with fields separated by | characters. |EOM| should come at the end of each message.

TS can have a state-less network interface such as provided by a user data protocol (UDP) system as used for outbound and inbound messaging over a suitable communication network. The PEMS-TS system utilizes these messages to include outbound packets using PEMS-TS for READ and ANNOUNCE information, as well as other data as described herein. In addition, an TS using PEMS-TS monitors the Internet connection for UDP PEMS messages from other PEMS configured TS system components or third-party programs coupled to the same communication network. This interface allows third-party programs to be developed which can work within the ITS architecture.

UDP packets as used by the present PEMS system can provide a very quick and relatively easy system to implement and from which to build flexible and robust applications. While there are known limitations for UDP packets, the describes application of the UDP packets in the PEMS system recognizes these limitations and adjusts the design and applications accordingly whereby UDP provides a very suitable solution for communicating between multiple ITS systems as well as sport timing auxiliary systems (STAS) in which auxiliary applications can provide vertical applications utilizing the information available within the PEMS system.

The following includes the packet structure for PEMS supported UDP message packets. The PEMS system including the PEMS reader and any PEMS configured TS system component can be configured to listen and send on any socket ranging from 5000 to 9999. In addition, PEMS can be set to send to a specific computer by using either the computer name or its IP address. Furthermore, PEMS can send to all computers on the network by using 0.255 as the last bytes in the IP address. Of course in other systems and embodiments other broadcast messaging address can also be used and still be within the scope of the present invention. In this example, if the PEMS system is set to 192.168.1.255, the PEMS system sends messages as Broadcast packets. PEMS message can be sent as clear text contained within the UDP packet, with fields separated by the "|" characters. In many embodiments, the end of message indicator |EOM| should come at the end of each message.

As noted, the PEMS network interface can be configured for stateless broadcast communications systems, such as UDP using a broadcasting IP address indicator such as 255. The networking interface can however support a variety of different types of messages. These can include broadcast messages, multicast messages and unicast messages, between and among various PEMS enabled ITS systems and components.

In some embodiments, broadcast PEMS messages can be transmitted from a PEMS system interface over the stateless broadcast communication network with no addressing as to the intended recipient as well as no identification the PEMS configured ITS system component that is sending or sent the message. As such, each of the Broadcast PEMS messages can be read by any listening PEMS component, and once received by that PEMS component, the receiving PEMS ITS system component does not know which other PEMS ITS system sent the message.

In some embodiments, multicast PEMS messages can be transmitted from the PEMS interface over the stateless broadcast communication network with no addressing as to the intended recipient. However, these messages include an identification of the sending ITS system component including the PEMS remote system, e.g., FROM identifier. The PEMS multicast messages can be read by any PEMS configured ITS system component and once received by that ITS system component, the receiving ITS system component knows from which of the other communicating ITS systems the message originated. These include, by way of example, the READ, RESEND, TSYNC, and RSIG messages.

In some embodiments, Unicast PEMS messages can be transmitted from the PEMS interface over the stateless broadcast communication network with an identification of which the sending entity is (FROM identifier) as well as an identification of the intended receiving ITS system component (DEST or Destination identifier). These unicast PEMS-TS messages are essentially point to point messaging within a stateless broadcast messaging communication system. Only the identified destination PEMS configured TS system should receive these messages and they are ignored by all other listening TS system. The receiving PEMS configured TS system knows that the message was intended for its use and it knows the identification of the sending PEMS component. These include, by way of example, the RESEND, LOOKUP, COMMAND, RQIMAGE, and STIMAGE messages by way of example.

It should be understood to those skilled in the art that other broadcast, multicast and/or unicast messages can also be developed as an application may require or benefit from the present disclosure, and still be considered within the scope of the present disclosure.

Read Message (READ):

The READ packet is sent by PEMS-TS to the network and can be captured by any device that is listening on the network for UDP packets. The packet is a real-time feed of any reads that are occurring at the particular TS timing system.

Packet length=variable size
Total fields=6
READ|FROM|BIB#|TIME|PACKET #|EOM|

Packet number is a value that begins with 1 and goes to 999. Once it reaches 999, it starts over again at 1. This packet number is used to reference past messages in case a message is lost on the network and a re-send is requested. Additionally a separate READ message can be used that includes the PARTICIPANTNAME field in lieu of the BIB#.

"PEMS" READ Message. In some embodiments of the above READ message can be used by PEMS to the manually entered tag serial number that was manually entered by the user of the PEMS remote. The time entry can be automatically generated by the PEMS remote, as described herein, or can also be a time that is manually entered. The PEMS READ message can contains the fields identified above, but will be described here for more detail as an example of the detail of one exemplary embodiment of PEMS.

Generally the multiple fields that can be any length. Each field is separated by the | character, and the last field should contain the EOM| indicator. The following describes each field:

READ—This is the type indicator and it will contain the text READ.

FROM—This is the IP address or network name for the Backup system.

TAGSERIALNUMBER—This is the tag serial number that was manually entered into the Backup system.

TIME—This field contains the time when the manual entry was made.

PACKET #—The Backup system can include a sequential packet number, which allows the receiving system to know if any messages were lost during the communications process.

EOM—This is the last field of the READ message and it indicates the end of the message.

As a second exemplary embodiment of a PEMS READ Message, the PEMS remote can provide for the transmission of the system and participant's name that was manually entered, as well as the time for that entry whether manually entered, automatically time-stamped or adjusted by the offset for the PEMS remote that is applicable at that time. The message contains multiple fields that can be any length. Each field is separated by the | character, and the last field should contain the EOM| indicator. The READ, FROM, TIME, PACKET # and EOM are described as above, however, in this embodiment, the field PARTICIPANTNAME is the name that was manually entered into the Backup system. This field could also contain any other key identifier as long as the receiving system is aware of the identifier.

Resend Message (RESEND):

The RESEND message is sent to any TS system requesting that it re-send a past message. If a message is lost over the network, a request to resend can be made for any of the last 999 messages sent previously. PEMS-TS maintains a buffer with the past 999 messages. Once the 999 position is used, PEMS-TS starts over at position 1. Thus, PEMS-TS system is maintaining a circular buffer of messages.

Packet length=variable size
Total fields=5
RESEND|FROM|DEST|PACKET #|EOM|

The Destination field is the ITS system that should respond to this request. This is the same name set in the ITS system defaults for "My Name" in the networking section. If a request is made for a packet number that has not yet been used by PEMS-TS, a packet response starting with the BLANK field can be received.

Time Sync Message (TSYNC):

The TSYNC message is sent using PEMS-TS to any ITS system that is listening for Time Sync commands. This is typically used by ITS and PEMS to make sure the time on the TS laptop is the same as that on the ITS system. There can always be a slight delay in the network transmission, and as such a 0.25 to 0.5 second delay may be added to the time received using PEMS-TS to compensate for the delay.

Packet length=variable size
Total fields=4
TSYNC|FROM|TIME|EOM|

The FROM field is the name set in the ITS Defaults as My Name.

As another exemplary detailed description, the PEMS TSYNC Message can be received at the PEMS system remote along with other ITS system components for the purposes of synchronizing the time with any other system on the network. This ensures that the PEMS remote system is using the same time, which is often required or beneficial for RFID timing systems used at sporting events.

The TSYNC message capability can provide any desired accuracy. In one embodiment, it can provide a level of accuracy around $1/10$th of a second wherein the time stamp is to a one-second period for the tag reads. In other embodiments, the system can be configured to enable $1/10$th or even $1/100$th second time stamping on tag reads and in such embodiments, the TSYNC message enabled accuracy will become even more important. In some embodiments, when a system receives the TSYNC message, the local clock time on the receiving system is adjusted immediately. In other words, the PC clock on the destination computer is adjusted right away.

The TSYNC message can be used for distributing a standard time to each of the connected RFID Tag Reader Systems (TRS) systems, the PEMS remote systems or any other ITS system component that may need to record or stamp a time, message or event. In one embodiment, the TSYNC message is a simple pushed time such that all receiving devices, such as receiving TRS systems and PEMS remote reset their internal clocks to the time as received or specified in the TSYNC message. Additionally, ITS component system including the PEMS remote can be adapted to adjust its internal clock from the exact time specified in the TSYNC message to account for transmission system delays or variances, as may be known or predicted.

The ITS primary or supervising system, may be a ITS user console or another system including one of the TRS systems. The selection of the standard time within the ITS system configuration can be selected based on the expected accuracy of the computer clock for such device or can be based on its physical location within the network or course. The ITS software provides for an initialization of the synchronization of all or some of the coupled TRS systems and the PEMS remotes. This can be manually initiated by a user of such system or can be configured as a part of an automated routine or process.

In some embodiments, the TSYNC message can be re-transmitted as an automated heartbeat message to provide for regular updating and to account for operational variances, as well as to provide reference times to provide updating where communication links may not continuously operate. As described herein, the Sync message can be transmitted to ITS components and the heartbeat message can support less expensive or complex systems that have clocks that less accurate and can drift one or more seconds over a 24 hour period. This can be important for applications wherein the total lapsed time is greater than a few hours.

Additionally, the receiving or transmitting system of the TSYNC message can be configured for compensation for communication system or transmission delays. This can be a predetermined or estimated compensation time, based on the system uses or network capabilities a value of 0.1 seconds to compensate for the network delay. This is based on using common Wi-Fi routers where the message delay across such a router using UDP datagrams is between 0.05 to 0.15 seconds. UDP datagrams are lower priority traffic, so some routers buffer them slightly.

Remote (PEMS) Signal Message (RSIG):

The RSIG message is sent using PEMS-TS to any system that is listening for RSIG command. This is typically used by ITS PEMS to make sure the connection over the network is good to PEMS-TS and also to verify that PEMS-TS is scanning and listening for PEMS entries.

Packet length=variable size
Total fields=4
RSIG|FROM|TIME|EOM|

The FROM field is the name set in the ITS Defaults as My Name.

Time Remote (PEMS) Offset Message (TROFFSET):

The TROFFSET message is sent using PEMS-TS interface and communications to a PEMS system from another ITS system component. This message can be used by PEMS as a input to adjust manually entered times at the PEMS system so that the manually entered time is offset or adjusted based on an externally provided estimate or predetermined amount of time as determined by the sending ITS system component.

Packet length=variable size
Total fields=4
TROFFSET|FROM|TIME|EOM|

In this message, the time is the offset set time or the amount of time for the PEMS system to adjust the manual entered big numbers from the PEMS terminal clock that is in synchronization due to the receiving of the TSYNC message. The FROM field is the name set of the ITS component originating the TROFFSET message. This can in some embodiments be the name set in the ITS Defaults as My Name.

Lookup Message (LOOKUP):

The LOOKUP message allows a device to request race information from another device. The identifier may be any text. In most cases, the identifier will be a tag serial number, race bib number, participant name, or perhaps a unique identifier that refers to a particular type of information. For example, if an ITS systems needs to know the current duration of a race, the LOOKUP message could be sent to an ITS system that is responsible for tracking the total race time. The identifier field might contain the text entry "RACETIME" and this entry could be used to indicate that the race duration is desired. The packet number field is optional and if not used, the field could contain a single space.

Packet length=variable size
Total fields=6
LOOKUP|FROM|DEST|IDENTIFIER|PACKET #|EOM|

Command Message (COMMAND): The COMMAND message can be sent to an ITS system to request that a particular command be executed in that ITS system. The IDENTIFIER field may contain any text desired. This field could be used to send any tag reader or participant or tag detector command to a PEMS device. For example, if the current battery charge level on a PEMS system needed to determined, a Command message could be sent with the text BATTERYSTATS in the IDENTIFIER field. The PEMS system would need to have functions built in that can process the command.

Packet length=variable size
Total fields=6
COMMAND|FROM|DEST|IDENTIFIER|PACKET #|EOM|

Request Image Message (RQIMAGE):

The RQIMAGE message is sent to a device to request that a particular image be returned. The message is useful when interfacing with a system that contains photographs or other pictures such as logos or artwork. The IDENTIFIER field should contain a unique descriptor for the image desired and may contain any text desired. Typically, this field will contain a unique number for a participant in an event. However, the IDENTIFIER could also contain a specific location on a PEMS system where a file is located. The COMPRESSION field may be used to specify the format of the image to be sent. If higher performance across a network is desired, this field might be used to indicate that High compression is desired. The field may contain any text that is recognized by the system designated as DEST. The PACKETSIZE field should contain a value indicating the maximum packet size to send at one time. Given that most images will contain more data than is able to be sent in a single packet, this field may be used to control packet size, thus tuning the network performance. The PSOCKET field is used when it necessary or desired to have multiple packet streams being sent simultaneously from the DEST. For example, the field could contain 7000 on one packet and 7001 on a different packet to indicate that two streams are being used simultaneously.

Packet length=variable size
Total fields=9
RQIMAGE|FROM|DEST|IDENTIFIER|COMPRESSION|PACKETSIZE|PSOCKET|PACKET #|EOM|

Image Sent Message (STIMAGE):

The STIMAGE message is sent from a system responding to a request for an image, e.g., RQIMAGE. The IDENTIFIER field should contain the unique descriptor for the image that was requested and that may contain any text desired. Typically, this field will contain a unique number for a participant in an event. However, the IDENTIFIER could also contain a specific location on a given system where a file is located. The COMPRESSION field indicates the type of compression used on the image when it was sent. If higher performance across a network is desired, this field might be used to indicate that High compression is desired. The PACKETSIZE field should contain a value indicating the length of the portion of the image just sent. Given that most images will contain more data than can be sent in a single packet, this field will be used to indicate how many bytes have been sent. The PSOCKET field contains a value indicating which stream the information is being sent on. This may be used when it necessary or desired to have multiple packet streams being sent simultaneously from a system. For example, this field could be used to send individual photos to different computers on a network at the same time.

Packet length=variable size
Total fields=9
STIMAGE|FROM|DEST|IDENTIFIER|COMPRESSION|PACKETSIZE|PSOCKET|PACKET #|EOM|

Request Image Library Contents Message (RQIDIR):

This message could be sent to a device to request that the names of all images available be provided for that system. The message is useful when interfacing with a system that contains photographs or other pictures such as logos or artwork. The IDENTIFIER field should contain a unique descriptor for the type of images desired or a filter mask for the names or locations of images. For example, the IDENTIFIER might contain the text entry *, or it might contain a qualifier such as *.JPG is the user only wants to receive a list of images that are in JPG format.

Packet length=variable size
Total fields=6
RQIDIR|FROM|DEST|IDENTIFIER|PACKET #|EOM|

Image Library Sent Message (STIDIR):

This message can be sent to one or more systems as a response to an RQIDIR message and it includes a list of images available. The FILELIST field will contain a list of images in text format that are available. Each image name will contain a carriage return line feed indicator at the end of the name. If the list has been completely transmitted, a final indicator at the end of the list will include an entry of EOL followed by a carriage return line feed. This indicator means there are no additional packets being sent and the entire list has been provided.

Packet length=variable size
Total fields=6
STIDIR|FROM|DEST|FILELIST|PACKET #|EOM|

Request Image Stream on Message (RQISTREAMON):

This message could be sent to a device to request that a particular image stream be enabled for a real-time video feed. The message is useful when interfacing with a system that contains a camera displaying live video. The IDENTIFIER field should contain a unique descriptor for the image stream desired and may contain any text desired. Typically, this field will contain a unique name for a camera or video interface. However, the IDENTIFIER could also contain a specific socket, URL, or other indicator that is a live video stream. The COMPRESSION field may be used to specify the format to be used when sending the video stream. If higher performance across a network is desired, this field might be used to indicate that High compression is desired. The field may contain any text that is recognized by the system designated as DEST. The PACKETSIZE field should contain a value indicating the maximum packet size to send at one time. Since the video stream will contain a great amount of information, the image stream can be deconstructed into small packets that are sent across the network. The PSOCKET field is used when it necessary or desired to have multiple packet streams being sent simultaneously from the DEST. For example, the field could contain 6000 on one packet and 6001 on a different packet to indicate that two streams are being used simultaneously. The TIMEOUT field can be used to indicate how long, in seconds, the stream should be kept alive. If this value is set to 0, the DEST will continue to send the stream until a RQISTREAMOFF message is received.

Packet length=variable size
Total fields=10
RQISTREAMON|FROM|DEST|IDENTIFIER|COMPRESSION|PACKETSIZE|PSOCKET|TIMEOUT|PACKET #|EOM|

Request Image Stream Off Message (RQISTREAMOFF):

This message could be sent to a device to request that a particular image stream be disabled. The IDENTIFIER field should contain a unique descriptor for the stream to be disabled. The PSOCKET field can also be used to identify a particular socket, in the event that multiple streams are being sent at the same time.

Packet length=variable size
Total fields=7
RQISTREAMOFF|FROM|DEST|IDENTIFIER|PSOCKET|PACKET #|EOM|

GPS Wakeup Message (GPSWAKE):

This message can be sent to a chip or remote system to request that a communication session begin. This message will cause the chip or remote system to send back parameters for the session in the buffer passed. The LSOCKET value can be used to identify a unique socket being used for the session. The SETTINGS value is used to request the chip or remote system conform to specific parameters for the session. Once a session is established, the caller will wait for data to show up in the buffer and process it accordingly. Thus, this message is ideal for setting up a long-term session where data will trickle in over time, into the Buffer allocated.

Packet length=variable size
Total fields=7
GPSWAKE|FROM|DEST|LSOCKET|SETTINGS|BUFFER|EOM|

GPS Wakeup and Receive Message (GPSRWAKE):

This message can be sent to a chip or remote system to request that a communication session begin with data being returned immediately. This message will cause the chip or remote system to send back GPS location and/or time information in the buffer passed. The LSOCKET value can be used to identify a unique socket being used for the session. The SETTINGS value is used to request the chip or remote system conform to specific parameters for the session. Once the initial data has been received the session will remain open and wait for additional data to appear in the buffer. This command differs from the GPSWAKE message since the GPSWAKE does not request data. It simply waits for data to show up. The GPSRWAKE message requests that all data be sent immediately, thus clearing the buffer on the chip or remote system right away.

Packet length=variable size
Total fields=7
GPSRWAKE|FROM|DEST|LSOCKET|SETTINGS-|BUFFER|EOM|

GPS Receive Message (GPSRMESS):

This message can be sent to a chip or remote system to request that all data be transmitted immediately. This is a stateless message that does not require a session to first be created. Thus, it is ideal for rapid communications with a chip or system. The LSOCKET value can be used to identify a unique socket being used to receive the data. The SETTINGS value is used to request the chip or remote system conform to specific parameters for the data transmission. BUFFER will contain the actual data coming back to the caller.

Packet length=variable size
Total fields=7
GPSRMESS|FROM|DEST|LSOCKET|SETTINGS-|BUFFER|EOM|

GPS Re-Send Message (GPSRSMESS):

This message can be sent to a chip or remote system to request that the data previously sent, be re-transmitted again. This can be used to retrieve data that may have been lost in route to the caller. This is a stateless message that does not require a session to first be created. Thus, it is ideal for rapid communications with a chip or system. The LSOCKET value can be used to identify a unique socket being used to receive the data. The SETTINGS value is used to request the chip or remote system conform to specific parameters for the data transmission. BUFFER will contain the actual data coming back to the caller.

Packet length=variable size
Total fields=7
GPSRSMESS|FROM|DEST|LSOCKET|SETTINGS-|BUFFER|EOM|

GPS Waypoint Message (GPSWAYP):

This message can be sent to a chip or remote system to request specific data that is based on a specific or range of waypoint values. This is a stateless message that does not require a session to first be created. Thus, it is ideal for rapid communications with a chip or system. The LSOCKET value can be used to identify a unique socket being used to receive the data. The SETTINGS value is used to request the chip or remote system conform to specific parameters for the data transmission. BUFFER will contain the actual data coming back to the caller.

Packet length=variable size
Total fields=7
GPSWAYP|FROM|DEST|LSOCKET|SETTINGS-|BUFFER|EOM|

GPS Send Message (GPSSENDS):

This message can be sent to a chip or remote system to transmit data immediately. This message requires you to first create a session. The TSOCKET value can be used to identify a unique socket on the remote system. The SETTINGS value is used to request the chip or remote system conform to specific parameters for the data reception. BUFFER will contain the actual data being sent. The advantage to using the GPSSENDS message is that the remote system will automatically handle error handling for lost messages that did not arrive.

Packet length=variable size
Total fields=7
GPSSENDS|FROM|DEST|LSOCKET|SETTINGS-|BUFFER|EOM|

GPS Send Message (GPSSENDC):

This message can be sent to a chip or remote system to transmit data immediately. This message does not require a session. The TSOCKET value can be used to identify a unique socket on the remote system. The SETTINGS value is used to request the chip or remote system conform to specific parameters for the data reception. BUFFER will contain the actual data being sent.

Packet length=variable size
Total fields=7
GPSSENDC|FROM|DEST|LSOCKET|SETTINGS-|BUFFER|EOM|

GPS Close Message (GPSCLOSE):

This message can be sent to a chip or remote system to let it know that transmissions are now over and the sockets being used are released. The TSOCKET value can be used to identify a unique socket on the remote system. This message is used for sessions that are always open.

Packet length=variable size
Total fields=5
GPSCLOSE|FROM|DEST|LSOCKET|EOM|

In other embodiments, the formats of the above or other PEMS message packet can vary from that described above and herein and still be within the scope of the present disclosure.

ITS-IC Network Interface Design Guidelines

The following can provide additional insight about how to use the PEMS-TS Networking Interface.

a) UDP packets are not guaranteed to be delivered on a network, as is the case with TCP. In some networks, routers cannot automatically send UDP packets unless they are configured to do so. For the PEMS-TS communication system as described herein, the router should be able to send UDP packets, as well as a broadcast datagram.

b) In some embodiments of the PEMS-TS communication system, the ITS system can only process inbound messages while it is connected to the timing system and the ITS system is Enabled and Scanning as addressed above. In such embodiments, if message packets are sent by PEMS to a PEMS configured ITS component, such sent message packets will be discarded unless such systems are in the Scanning mode.

c) In some embodiments, the PEMS remote and or PEMS configured ITS system can send and receive messages only if configured to do so in the software defaults. As such, the defaults should be set properly and enabling system/software may need to be rebooted after making any changes to ensure that the networking functions have started properly.

d) When PEMS remote or PEMS configured ITS system sends a message packet, it can actually send the first packet, wait about 10 milliseconds, and send a second identical packet. Additionally as discussed this can be sent more than two times and the times between the duplicates message packets can vary based on the user and system requirements. This architecture can increase the odds that a packet can reach the destination IP address without having to add the overhead of an acknowledgement message function to the PEMS protocol. For example, in a PEMS configured ITS component r application, a filter can be created to identify and discard redundant packets. In other embodiments, the receipt, analysis and management of the redundant PEMS messages can be managed in other manners as may be desired by the user.

e) In some embodiments, the PEMS system can be designed to have minimal overhead and functionality. As such, in some embodiments, the PEMS system or PEMS configured ITS system component can be configured to ignore any errors. For example, the PEMS interface or functionality can be configured so that no error messages are sent or initiated if a PEMS message packet is transmitted or received in an improper format. In such embodiments, the malformed packet can simply be discarded.

f) While the ITS system is scanning for chip reads and PEMS Read messages, it can check the ITS network packet buffer approximately every 1 to 3 seconds for new messages that have been received. The PEMS configured ITS components can utilize an automatic load balancing system for packet processing. If the ITS system determines that the chip read and PEMS read low is lighter than normal, the ITS system can be configured to speed up the processing of inbound TRS chip read and PEMS read messages. This improve the performance of the ITS system and increase the number of Read message from the TRS systems and the PEMS remote.

g) When either the PEMS remote or PEMS configured ITS system component is transmitting messages to the other ITS PEMS entities, in some embodiments, such systems cannot process inbound messages until the sending or receiving of the PEMS messages is completed.

i) In some embodiments, the ITS system components and applications, including the PEMS system and the PEMS configured ITS components use one socket for outbound packets, and a different socket for inbound messages. Thus, any PEMS system application should use the sockets designated in the PEMS-TS specification or as defined by the user as addressed later within in this specification. herein.

PEMS-TS Interfacing Application Example

The following is pseudo code for creating a PEMS-TS UDP client application. This is simply an example of the type of PEMS-TS communication code that can be implemented using the PEMS-TS system and method as described herein.

```
int main( )
{
int socketnum;
struct socketnumaddress_in server_address;
struct hostloc *host;
char packet_data[128];
host = (struct hostloc *) gethostbyname((char *)"192.168.1.255");
server_address.sin_family = AF_INET;
server_address.sin_port = htons(6002);
server_address.sin_addr = *((struct in_addr *)host->h_addr);
bzero(&(server_address.sin_zero),8);
while (True)
{
printf("Type EXIT when done.");
gets(packet_data);
if ((strcmp(packet_data , "EXIT") == 0))
{
printf("Program done.");
exit;
}
sendto(socketnum, packet_data, strlen(packet_data), 0,(struct socketnumaddress*)&server_addr,
sizeof(struct socketnumaddress));
  }
}
```

Figure 15:
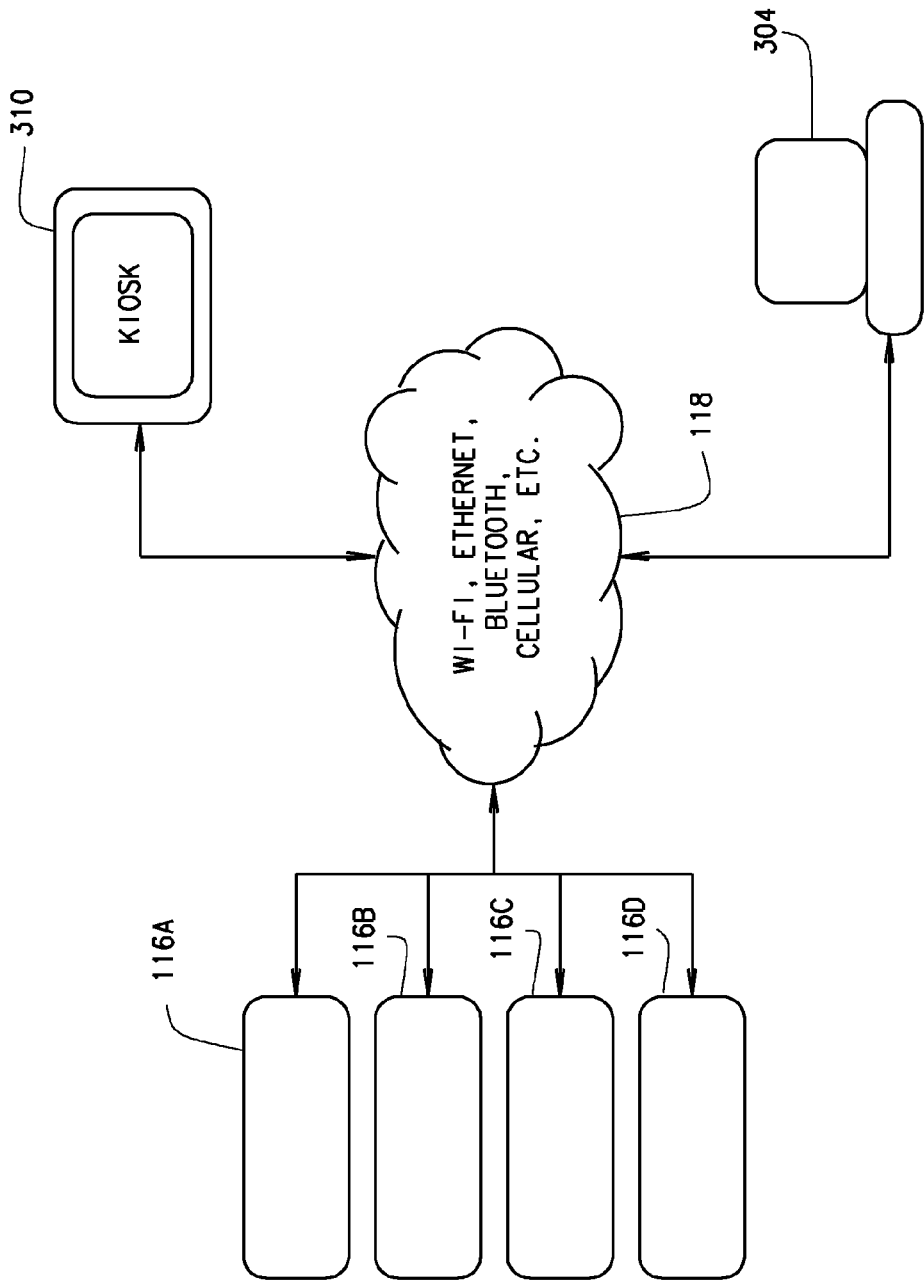
FIG. 15 is a block diagram of a participant event management system PEMS used for registration and pre-ordering of participant event related services according to one exemplary embodiment.
Figure 16:
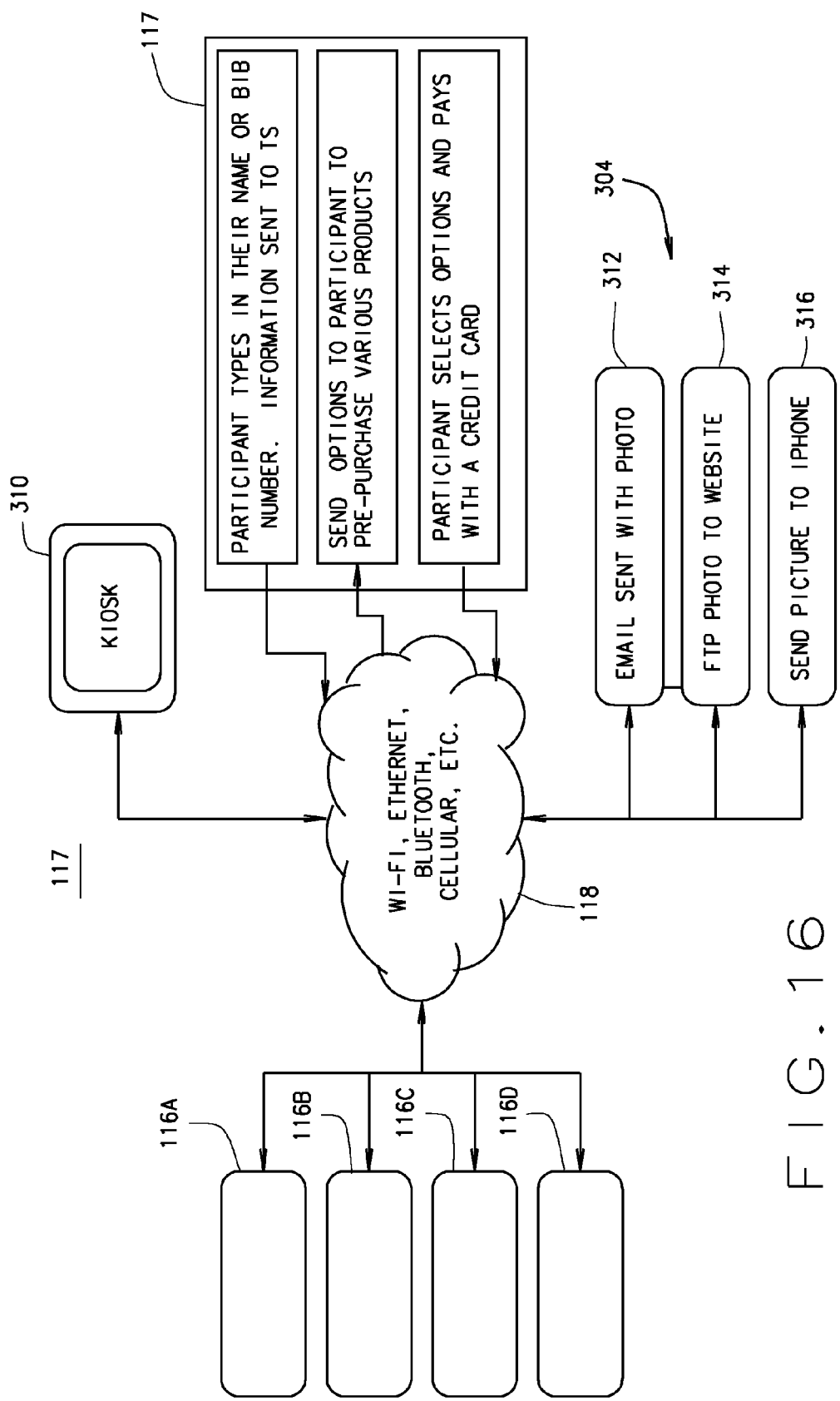
FIG. 16 is a second block diagram of a participant event management system PEMS used for registration and pre-ordering of participant event related services and the subsequent providing of those pre-ordered event related services according to one exemplary embodiment.

FIG. 15 is a block diagram of a participant event management system PEMS 117 used for registration and pre-ordering of participant event related services according to one exemplary embodiment. As shown, a single PEMS 117 can be associated with a plurality of timing systems 116A, 116B, 116C and 116D, by way of example. The communication network 118 can provide the interfacing between the PEMS 117 with each timing system 116A, 116B, 116C and 116D and with outputs 304 such as KIOSK 310. All of these can be distributed and implemented in any manner and in any location. Similarly, FIG. 16 is a second block diagram of a participant event management system PEMS 117 used for registration and pre-ordering of participant event related services and the subsequent providing of those pre-ordered event related services according to one exemplary embodiment. As shown in FIG. 16, the participant using PEMS 117 user interface inputs their name or bib number and the information is sent to the TS 116. The particular TS 116 can then communicate with the PEMS 117 the particular image capture options and services available for a particular event as be managed by the particular timing system 116. These can include pre-purchased products for the image capture services. The participant can also select any offered options and pay for the options via credit card or other suitable means. The participant can also select the output such as KIOSK 310 or this can be directed by the event manager. The participant can provide an email address for which the captured image can be sent as in 312, a website url to which the FTP photo can be posted in 314 or the telephone number that the captured image or images can be sent to a mobile phone or tablet in 316. These are only examples of some of the variations in the PEMS 117 integration with the ITS 116 as disclosed herein. One skilled in the art will understand that various combinations of these disclosed embodiments are possible even though not arranged herein and that equivalent technologies are possible and are still considered to be within the scope of the PEMS 117 ITS 116 integration disclosed.

PEMS and ITS Exemplary Computer Operating Environments

Figure 17:
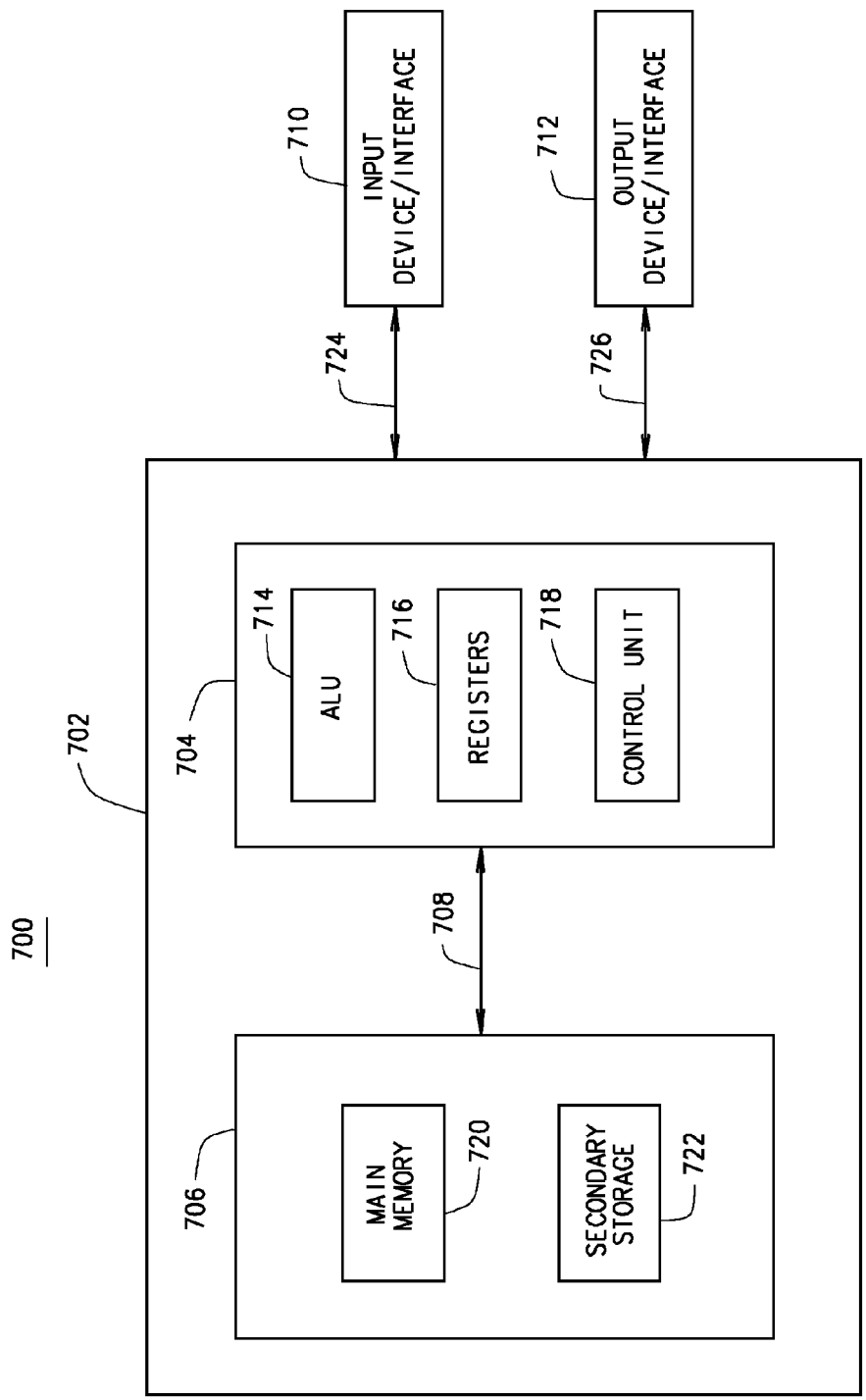
FIG. 17 is a block diagram of a specialized ITS computer system that is also suitable for implementing the object detection systems and timing systems in various embodiments as described herein.

Referring to FIG. 17, an operating environment for an illustrated embodiment of the ITS, the TS, the TRS and/or PEMS as described herein can included or be implemented in a computer system 700 with a computer 702 that comprises at least one high speed central processing unit (CPU) 704, in conjunction with a memory system 706 interconnected with at least one bus structure 708, an input device 710, and an output device 712. These elements are interconnected by at least one bus structure 708. As addressed above, the input and output devices can include a communication interface including an antenna interface. Any or all of the computer components of the ITS system including the PEMS-TS network interface and communications systems and methods can be any computing device including, but not limited to, a lap top, PDA, Cell/mobile phone, as well as potentially a dedicated device. The software can be implemented as any "app" thereon and still be within the scope of this disclosure.

The illustrated CPU 704 for an PEMS-TS, tag reader or detection system is of familiar design and includes an arithmetic logic unit (ALU) 714 for performing computations, a collection of registers for temporary storage of data and instructions, and a control unit 716 for controlling operation of the computer system 700. Any of a variety of processors, including at least those from Digital Equipment, Sun, MIPS, Motorola, NEC, Intel, Cyrix, AMD, HP, and Nexgen, is equally preferred but not limited thereto, for the CPU 704. This illustrated embodiment operates on an operating system designed to be portable to any of these processing platforms.

The memory system 706 generally includes high-speed main memory 720 in the form of a medium such as random access memory (RAM) and read only memory (ROM) semiconductor devices that are typical on a PEMS-TS, tag reader or detection system. However, the present disclosure is not limited thereto and can also include secondary storage 722 in the form of long-term storage mediums such as floppy disks, hard disks, tape, CD-ROM, flash memory, etc., and other devices that store data using electrical, magnetic, and optical or other recording media. The main memory 720 also can include, in some embodiments, a video display memory for displaying images through a display device (not shown). Those skilled in the art will recognize that the memory system 706 can comprise a variety of alternative components having a variety of storage capacities.

Where applicable, an input device 710, and output device 712 can also be provided in the PEMS-TS, tag reader or detection system. The input device 710 can comprise any keyboard, mouse, physical transducer (e.g. a microphone), and can be interconnected to the computer 702 via an input interface 724, such as a graphical user interface, associated with or separate from the above described communication interface including the antenna interface for wireless communications. The output device 712 can include a display, a printer, a transducer (e.g. a speaker), etc., and be interconnected to the computer 702 via an output interface 726 that can include the above described communication interface including the antenna interface. Some devices, such as a network adapter or a modem, can be used as input and/or output devices.

As is familiar to those skilled in the art, the computer system 700 further includes an operating system and at least one application program. The operating system is the set of software that controls the computer system's operation and the allocation of resources. The application program is the set of software that performs a task desired by an ITS user, using computer resources made available through the operating system. Both are typically resident in the illustrated memory system 706 that may be resident on the PEMS-TS, tag reader or detection system.

In accordance with the practices of persons skilled in the art of computer programming, the present disclosure is described below with reference to symbolic representations of operations that are performed by the computer system 700. Such operations are sometimes referred to as being computer-executed. It will be appreciated that the operations that are symbolically represented include the manipulation by the CPU 704 of electrical signals representing data bits and the maintenance of data bits at memory locations in the memory system 706, as well as other processing of signals. The memory locations where data bits are maintained are physical locations that have particular electrical, magnetic, or optical properties corresponding to the data bits. One or more embodiments can be implemented in tangible form in a program or programs defined by computer executable instructions that can be stored on a computer-readable medium. The computer-readable medium can be any of the devices, or a combination of the devices, described above in connection with the memory system 706.

When describing elements or features and/or embodiments thereof, the articles "a", "an", "the", and "said" are intended to mean that there are one or more of the elements or features. The terms "comprising", "including", and "having" are intended to be inclusive and mean that there may be additional elements or features beyond those specifically described.

Those skilled in the art will recognize that various changes can be made to the exemplary embodiments and implementations described above without departing from the scope of the disclosure. Accordingly, all matter contained in the above description or shown in the accompanying drawings should be interpreted as illustrative and not in a limiting sense.

It is further to be understood that the processes or steps described herein are not to be construed as necessarily requiring their performance in the particular order discussed or illustrated. It is also to be understood that additional or alternative processes or steps may be employed.

The invention claimed is:

1. An automated system for managing a pre-ordering and responsive automated capturing of an image of a participant that is participating in an event wherein the participant is automatically identified for automated image capture using a participant identifier having a unique participant identifier number, the system comprising:

a participant event management system (PEMS) including a user interface receiving an input from the participant including participant data and a registration of the participant in the timed event, the PEMS assigning the participant a participant event number responsive thereto, the PEMS also receiving a preorder request for capturing an image of the participant during the event, the PEMS having a communication interface transmitting the assigned participant event number and the preorder request;

an participant proximity detector detecting the participant when in proximity to the participant proximity detector at a detection point during the event and receiving the participant identifier number from the participant identifier, identifying a read time of the received participant identifier read, and transmitting the participant identifier number and the identified participant identifier read time over a data interface;

a timing system having a data communication interface, a memory and computer executable instructions, the timing system receiving the participant identifier number and the participant identifier read time from the participant proximity detector, receiving the transmitted portion of the assigned participant event number and the preorder request from the PEMS, determining a time of passing of the detection point of the participant responsive to the received participant identifier number and participant identifier read time, associating the participant event number with the participant identifier number and generating the instruction for capturing the image of the participant;

an image capture system with an image capture device and a data interface receiving the generated instruction from the timing system for capturing an image of the participant, capturing at least one image of the participant responsive to the received generated instruction, said capturing being when the participant identifier of the participant is in proximity to the participant proximity detector, generating an image capture message including the captured at least one image, and transmitting the image capture message over the data interface to the timing system; and wherein the timing system is configured for receiving the transmitted image capture message from the image capture system, and storing in the memory the determined time of passing and the image of the image capture message in the memory associated with the assigned participant event number.

2. The system of claim 1 wherein the preorder request includes a designation for the delivery of the captured image, wherein the PEMS transmits the delivery designation and the timing system receiving the transmitted delivery designation, wherein the timing system transmits the received at least one captured image received within the image capture message over the data communication interface responsive to the received delivery designation.

3. The system of claim 2 wherein the delivery designation is selected from the group consisting of a web page url, a web page url of the PEMS, a mobile phone address, an email address, a text message address, a social network wall url; and an internet address.

4. The system of claim 2 wherein the preorder request includes a designation for delivery of the captured image during or following the event, wherein such delivery designation includes one or more of the following:
  a) updating the participant's social network wall with the captured image and/or determined time of passing;
  b) updating a third parties social network wall with the captured image and/or determined time of passing;
  c) transmitting an email to an email address including the captured image and/or determined time of passing;
  d) transmitting a text message to telephone number including the captured image and/or determined time of passing;
  e) posting on a webpage the captured image and/or determined time of passing;
  f) updating an application with the captured image and/or determined time of passing;
  g) displaying on a coupled display the captured image and/or determined time of passing; and
  h) updating a webpage or display or data file in the PEMS with the captured image and/or determined time of passing;
  and wherein the timing system is configured with a data interface for transmitting the at least one received captured image to the one or more delivery designation.

5. The system of claim 1 wherein the PEMS includes a payment receipt interface for receiving a payment by the participant in response to the participant registration for the event and submitting the preorder request for capturing an image of the participant during the event.

6. The system of claim 5 wherein the PEMS transmits a payment indicator reflecting the received payment and identifying services associated with said received payment, and wherein the timing system receives the payment indicator for the participant and stores the payment indicator and identifies the services associated with the payment in a data file associated with the participant, such as a bib number, a participant identifier number, the participant event number, or an RFID tag number of the participant.

7. The system of claim 1 wherein the image capture system captures the image in an encrypted and/or compressed format and wherein the transmitted image capture message image includes an indicator that the included captured image is encrypted and/or compressed.

8. The system of claim 1 wherein the PEMS receives in the preorder requests a request for tracking of the participant during the event;
  the automated system further comprises a location device associated with the participant identifier of the participant, the location device having a location data receiver for receiving location data from a location providing source, and a wireless communication interface, the location detection device receiving participant location information from the location providing source, time stamping each received participant location information, and transmitting participant location data including the participant location information over the wireless interface;
  a location detection device in at least periodic wireless communication with the participant location device for receiving the transmitted participant location data, and transmitting the received participant location data to the timing system;
  wherein the timing system receives the preorder request from the PEMS including the request for tracking of the participant and stores the received location data for the participant in a data file associated with the participant.

9. The system of claim 8 wherein the preorder request includes a designation for the delivery of the tracking data during or following the event, wherein the PEMS transmits the tracking delivery designation and the timing system receiving the transmitted tracking delivery designation, wherein the timing system transmits the received tracking data over the data communication interface responsive to the received tracking delivery designation.

10. The system of claim 9 wherein the tracking delivery designation is selected from the group consisting of a web page url, a web page url of the PEMS, a mobile phone address, an email address, a text message address, a social network wall url; and an internet address.

11. The system of claim 9 wherein the preorder request includes a designation for delivery of the tracking data of the participant during or following the event, wherein such tracking delivery designation includes one or more of the following:
  a) updating the participant's social network wall with the tracking data and/or determined time of passing;
  b) updating a third parties social network wall with the tracking data and/or determined time of passing;
  c) posting on a webpage the tracking data and/or determined time of passing;
  d) updating an application with the tracking data and/or determined time of passing;
  e) displaying on a coupled display a map showing the location based on the tracking data for the participant; and
  f) updating a webpage or display or data file in the PEMS with the captured image and/or determined time of passing;
  and wherein the timing system is configured for transmitting the tracking data to the one or more tracking delivery designation.

12. The system of claim 1 wherein the PEMS system hosts a webpage including the user interface.

13. The system of claim 1 wherein the participant identifier is an RFID tag having an RFID tag number as the participant identifier number and the participant proximity detector is an RFID tag reader.

14. The system of claim 1 wherein the participant proximity detector includes a GPS receiver and wherein a plurality of GPS locations is transmitted by the participant proximity detector.

15. An automated method for managing a pre-ordering and responsive automated capturing of an image of a participant that is participating in an event wherein the participant is automatically identified for automated image capture using an participant identifier having a unique participant identifier number, the method comprising:

a) in a participant event management system (PEMS) having a user interface:
   receiving an input from the participant including participant data and a registration of the participant in the event;
   assigning the participant a participant event number responsive thereto;
   receiving a preorder request for capturing an image of the participant during the event;
   transmitting the assigned participant event number and the preorder request;
b) in a participant proximity detector configured;
   detecting the participant identifier when in proximity to the participant proximity detector at a detection point during the event;
   receiving the participant identifier number from the participant identifier;
   identifying a read time of the received participant identifier read; and
   transmitting the participant identifier number and the identified participant identifier read time over a data interface to a timing system;
c) in an image capture system with an image capture device and a data interface configured:
   receiving an instruction from the timing system for capturing an image of the participant associated with the participant identifier number,
   capturing at least one image of the participant to the received instruction,
   generating an image capture message including the at least one captured image, and
   transmitting the image capture message over the data interface; and
d) in a timing system having a processor, a data communication interface, a memory and computer executable instructions:
   receiving the assigned participant event number and the preorder request from the PEMS;
   receiving the participant identifier number and the participant identifier read time from the participant proximity detector;
   determining a time of passing of the detection point of the participant responsive to the received participant identifier number and participant identifier read time;
   storing the determined time of passing associated with the assigned participant event number;
   associating the participant event number with the participant identifier number;
   generating the instruction to the image capture device for capturing the image of the participant when the participant event number is associated with the participant identifier number;
   receiving the transmitted image capture message from the image capture system; and
   storing in the memory the at least one image received within the received image capture message associated with the assigned participant event number.

16. The method of claim 15 wherein the preorder request includes a designation for the delivery of the captured image, wherein in the PEMS transmitting the delivery designation and in the timing system receiving the transmitted delivery designation, transmitting the received at least one captured image received within the image capture message over the data communication interface responsive to the received delivery designation.

17. The method of claim 16 wherein the delivery designation is selected from the group consisting of a web page url, a web page url of the PEMS, a mobile phone address, an email address, a text message address, a social network wall url; and an internet address.

18. The method of claim 16 wherein the preorder request includes a designation for delivery of the captured image during or following the event, wherein such delivery designation includes one or more of the following processes and such process are responsively performed by the timing system:
   a) updating the participant's social network wall with the captured image and/or determined time of passing;
   b) updating a third parties social network wall with the captured image and/or determined time of passing;
   c) transmitting an email to an email address including the captured image and/or determined time of passing;
   d) transmitting a text message to telephone number including the captured image and/or determined time of passing;
   e) posting on a webpage the captured image and/or determined time of passing;
   f) updating an application with the captured image and/or determined time of passing;
   g) displaying on a coupled display the captured image and/or determined time of passing; and
   h) updating a webpage or display or data file in the PEMS with the captured image and/or determined time of passing,
   and wherein the timing system is configured with a data interface for transmitting the at least one received captured image to the one or more delivery designation.

19. The method of claim 15 wherein in the PEMS receiving a payment by the participant in response to the participant registering for the event and/or submitting the preorder request for capturing an image of the participant during the event.

20. The method of claim 19 wherein in the PEMS transmitting a payment indicator reflecting said payment and identifying services associated with said received payment, and wherein in the timing system receiving the payment indicator for the participant and storing the payment indicator and identifying the services associated with the payment in a data file associated with the participant, such as the bib number, participant identifier number, or an RFID tag number.

21. The method of claim 15 wherein the method also includes encrypting and/or compressing the image that is transmitted and includes an indicator of such encryption or compression.

22. The method of claim 15 wherein in the PEMS receives a preorder request for tracking of the participant during the event, in a location device associated with the participant identifier of the participant; receiving location data from a location providing source, time stamping each received location information, and transmitting location data over the wireless interface; and in a location detection device in at least periodic wireless communication with the location device for receiving the transmitted participant location data, and transmitting the received location data to the timing system, wherein in the timing system receiving the preorder request from the PEMS including the request for tracking of the participant and storing the received location data for the participant in a data file associated with the participant.

23. The method of claim 22 wherein in the PEMS receives in the preorder request a designation for the delivery of the tracking data during or following the event, transmits the tracking delivery designation in the preorder request and in the timing system receiving the transmitted tracking delivery designation and transmitting the received tracking data over the data communication interface responsive to the received tracking delivery designation.

24. The method of claim 23 wherein the tracking delivery designation is selected from the group consisting of a web page url, a web page url of the PEMS, a mobile phone address, an email address, a text message address, a social network wall url; and an internet address.

25. The method of claim 23 wherein the preorder request includes a designation for delivery of the tracking data of the participant during or following the event, wherein such tracking delivery designation and the processes of the timing system include one or more of the following:
   a) updating the participant's social network wall with the tracking data and/or determined time of passing,
   b) updating a third parties social network wall with the tracking data and/or determined time of passing,
   c) posting on a webpage the tracking data and/or determined time of passing
   d) updating an application with the tracking data and/or determined time of passing,
   e) displaying on a coupled display a map showing the location based on the tracking data for the participant, and
   f) updating a webpage or display or data file in the PEMS with the captured image and/or determined time of passing.

26. The method of claim 15 wherein the PEMS system hosts a webpage including the user interface.

* * * * *